US007194524B2

(12) United States Patent
Suzuki et al.

(10) Patent No.: US 7,194,524 B2
(45) Date of Patent: Mar. 20, 2007

(54) INFORMATION PROCESSING SYSTEM, INFORMATION DISCLOSING SERVER, AND PORTAL SERVER

(75) Inventors: Hiroyuki Suzuki, Kawasaki (JP); Koji Wakio, Kawasaki (JP); Masaharu Koyabu, Kawasaki (JP); Tsuneichi Yoshizawa, Kawasaki (JP); Yoshinori Tanabe, Kawasaki (JP); Masashi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 653 days.

(21) Appl. No.: 09/812,550

(22) Filed: Mar. 21, 2001

(65) Prior Publication Data

US 2002/0072922 A1 Jun. 13, 2002

(30) Foreign Application Priority Data

May 16, 2000 (JP) ............................ 2000-142623

(51) Int. Cl.
*G06F 15/16* (2006.01)

(52) U.S. Cl. ...................... 709/219; 709/202; 709/203; 709/216; 709/217; 709/224; 707/1; 707/10

(58) Field of Classification Search ................ 709/202, 709/203, 216, 217–219, 224; 707/1, 10
See application file for complete search history.

(56) References Cited

U.S. PATENT DOCUMENTS 5,915,240 A * 6/1999 Karpf ............................ 705/2
6,327,628 B1 * 12/2001 Anuff et al. ................ 719/311
6,466,970 B1 * 10/2002 Lee et al. .................... 709/217
2004/0103097 A1 * 5/2004 Wesinger et al. .............. 707/9
2005/0010634 A1 * 1/2005 Henderson et al. ......... 709/201
2005/0015772 A1 * 1/2005 Saare et al. ................. 719/310
2005/0097190 A1 * 5/2005 Abdelhak ................... 709/217
2006/0248189 A1 * 11/2006 Jerrard-Dunne et al. .... 709/225

FOREIGN PATENT DOCUMENTS

JP 2001034616 A 2/2001

* cited by examiner

*Primary Examiner*—Bharat Barot
*Assistant Examiner*—Shawki Ismail
(74) *Attorney, Agent, or Firm*—Staas & Halsey LLP

(57) ABSTRACT

An information processing system that can create a page easily by the use of contents disclosed from information disclosing servers. A contents storing section stores contents to be provided. In this information processing system, an additional information storing section stores additional information consisting of information indicating the respective attributes of contents stored in the contents storing section and relations among the contents. An additional information obtaining section obtains additional information from an information disclosing server. An additional information storage section stores additional information obtained. An editing section edits additional information stored in the additional information storage section according to an administrator's intention or a user's taste. A display data creating section creates display data for displaying a page from additional information stored in the additional information storage section at the request of a client. A sending section sends display data created to a client which made a request. A send requesting section requests to send predetermined display data. A receiving section receives display data sent. A display outputting section outputs received display data to a display device.

9 Claims, 34 Drawing Sheets

| | |
|---|---|
| NAME | IDENTIFIER FOR CONTENTS |
| TYPE | TYPE OF CONTENTS |
| REPRE-SENTATION | REPRESENTATION OF CONTENTS IN HTML |
| COMMENT | COMMENT ABOUT CONTENTS |
| UPDATE TIME | DATE AND HOUR AT WHICH CONTENTS WERE UPDATED |

FIG. 5

| | |
|---|---|
| URL | URL USED TO ACCESS |
| CAPTION | CHARACTER STRING ETC. LINKED |
| EXPLANATORY SENTENCE | EXPLANATORY SENTENCE FOR CONTENTS |

FIG. 6

| | |
|---|---|
| URL | URL USED TO ACCESS |
| ARGUMENT | LIST OF ARGUMENT INFORMATION (THE NUMBER OF LISTS IS EQUAL TO THAT OF ARGUMENTS) |

FIG. 7(A)

| | |
|---|---|
| ARGUMENT NAME | NAME OF ARGUMENT |
| TYPE | TEXT, TEXTAREA, HIDDEN, RADIO, CHECKLIST, ••• |
| DEFINED VALUE | DEFINED VALUE FOR ARGUMENT |

FIG. 7(B)

| | |
|---|---|
| CLASSI-FICATION | ALARM, UPDATE, STATUS, USER DEFINITION |
| SERVER | SERVER WHICH ISSUES AN EVENT |
| KEY | IDENTIFIER FOR SPECIFYING EVENT |
| CONTENTS OF NOTICE | TEXT, FLAG (DEPENDENT ON THE CONTENTS OF AN EVENT) |
| EXPIRE | DATE AND HOUR WHEN EVENT BECOMES INVALID |
| FORCED MODE | WHETHER NOTICE IS REQUIRED (IF A USER DOES NOT MAKE A SELECTION) |
| NOTICE DESTINATION | LIST OF USERS OR GROUPS |

FIG. 8

| | |
|---|---|
| CLASS | NAME OF CLASS FILE FOR APPLET |
| WIDTH | WIDTH OF APPLET |
| HEIGHT | HEIGHT OF APPLET |
| ARGUMENT INFORMATION | INFORMATION REGARDING ARGUMENT |

FIG. 9(A)

| | |
|---|---|
| NAME | NAME OF ARGUMENT |
| VALUE | VALUE OF ARGUMENT |
| COMMENT | COMMENT, SUCH AS DESCRIPTION |

FIG. 9(B)

| | |
|---|---|
| APPLICABLE OBJECT | APPLET OBJECT WHICH CAN USE THE OBJECT IN QUESTION AS AN ARGUMENT |
| NAME | NAME OF ARGUMENT |
| VALUE | VALUE OF ARGUMENT |
| COMMENT | DESCRIPTION OF OBJECT ETC. |

FIG. 10(A)

| | |
|---|---|
| ACQUISITION FORMAT | FILE FORMAT |
| VERSION NUMBER | NUMBER OF VERSION WHICH CAN BE ACQUIRED |
| UPDATE TIME FOR EACH VERSION | DATE AND HOUR WHEN EACH VERSION WAS UPDATED |

FIG. 10(B)

```
<folder>
 <title>all-companies</title>
 <comment>all-companies folder </comment>
    <template>ap1.tmpl</template>
 <content TYPE=soneki_applet mtime="1 Apr 2000 04:00:03 +0900">
  <title>all-companies anticipated profit and loss</title>
  <class>soneki.zensha</class>
     <width>300</width>
     <height>200</height>
     <comment>display all-companies anticipated profit and loss
       with sales data as input</comment>
    </content>
 <folder>
  <title>classified-by-region</title>
  <comment>classified-by-region folder</comment>
     <template>ap1.tmpl</template>
  <content TYPE=soneki_applet mtime="1 Apr 2000 04:00:03 +0900">
    <title>classified-by-region anticipated profit and loss</title>
    <class>soneki.chikubetsu</class>
       <width>300</width>
       <height>200</height>
       <parameter>
         <name>region</name>
         <comment>designate a region name</comment>
       </parameter>
       <comment>display classified-by-region anticipated profit and
        loss with sales data as input</comment>
     </content>
   <folder>
    <title>classified-by-company</title>
    <comment>classified-by-company folder</
```

FIG. 12

| | |
|---|---|
| CONTENTS TYPE | PLURALITY OF TYPES CAN BE DESIGNATED |
| COLLECT ALL INFORMATION | DATE AND HOUR WHEN ALL PIECES OF INFORMATION ARE COLLECTED |
| COLLECT CHANGE INFORMATION | DATE AND HOUR WHEN CHANGE INFORMATION IS COLLECTED |

FIG. 14

```
<request-message version="1.0">
<command name="PORTAL ">
<header reply-encoding="Shift_JIS"></header>
<query>
    <statement>
            <subject name="MetaInfo">
            <ontology name="BIPortal">
     </statement>
</query>
</request-message>
```

FIG. 15

```
<HTML><BODY>
<!DO "content1 = thisFolder().content();">
<!REPLACE "content1.display(Region:=wit_ARG1,
Child:=thisFolder().subFolder())">
</BODY></HTML>
```

FIG. 28

```
<HTML><BODY>
<APPLET code="soneki.zentai" width=300 height=200>
<PARAM name=child value="http://server name/contents/server A/all-companies/
              classified-by-region/">
</APPLET>
</BODY></HTML>
```

FIG. 29

```
<HTML><BODY>
<APPLET code="soneki.chikubetsu" width=300 height=200>
<PARAM name=Region value=Tokyo>
<PARAM name=child value="http://server name/contents/server A/all-companies/
                          classified-by-region/classified-by-company">
</APPLET>
</BODY></HTML>
```

FIG. 31

```
<HTML><BODY>
<APPLET code="soneki.houmon.kaisha" width=300 height=200>
<PARAM name=company value="A Company">
<PARAM name=child value="">
</APPLET>
</BODY></HTML>
```

FIG. 33

INFORMATION PROCESSING SYSTEM, INFORMATION DISCLOSING SERVER, AND PORTAL SERVER

BACKGROUND OF THE INVENTION (1) Field of the Invention

This invention relates to an information processing apparatus and, more particularly, to an information processing apparatus for obtaining information from a server storing attribute information indicating the attribute and logical structure of each piece of information or each service which can be provided and for providing it to a client.

(2) Description of the Related Art

A Web page which a user first accesses to connect to the Internet is sometimes referred to as a portal site.

A portal site is usually a search engine, which provides services to retrieve information scattered on the Internet by a keyword.

Such a portal site collects information disbursed on the Internet by the use of, for example, a search robot, and creates a database on the basis of it. When a keyword is given by a user, the portal site retrieves the appropriate information from the database and provides it to the user.

In conventional methods, a database is created from information on the Internet by associating and storing the uniform resource locator (URL) of a page described in the hypertext markup language (HTML) and meta-information (keyword, for example) described on that page, which are obtained by a search robot. When a keyword is given by a user, meta-information corresponding to the keyword is retrieved and the meta-information and URL obtained are returned as retrieval results.

By the way, on a portal server currently used, display is customized according to users. Display contents can be customized according to users or groups and only contents in which each user is interested can be selectively displayed.

With a portal page currently used, however, the administrator of a portal site needs to build up a system in which display can be customized according to users. This involves troublesome work. Furthermore, if the amount of information to which reference is being made increases or if information to which reference is being made is changed, work to cope with this must be performed.

SUMMARY OF THE INVENTION

In order to address such problems, the present invention was made. In other words, an object of the present invention is to provide an information processing apparatus that can easily edit and process information being an object of distributed management.

In order to achieve the above object, an information processing system comprising an information disclosing server for disclosing contents and a portal server for obtaining information regarding contents from the information disclosing server and for creating display data provided to a client is provided. The information disclosing server in this information processing system comprises contents storing means for storing the contents and additional information storing means for storing additional information indicating the respective attributes of contents to be disclosed of contents stored in the contents storing means and relations among the contents to be disclosed. The portal server in this information processing system comprises additional information obtaining means for obtaining additional information stored in the additional information storing means in the information disclosing server, additional information storage means for storing additional information obtained by the additional information obtaining means, display data creating means for obtaining, in the case of a request having been made from the client, the appropriate additional information from the additional information storage means and for creating display data, and sending means for sending display data created by the display data creating means to the client which made a request.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a view showing an example of attribute information possessed by all contents.

FIG. 6 is a view showing an example of attribute information possessed by general contents.

FIG. 7(A) is a view showing an example of attribute information possessed by form access contents and FIG. 7(B) is a view showing an example of their arguments.

FIG. 8 is a view showing an example of attribute information possessed by an event.

FIG. 9(A) is a view showing an example of attribute information possessed by an applet and FIG. 9(B) is a view showing an example of its argument information.

FIG. 10(A) is a view showing an example of attribute information possessed by a parameter object and FIG. 10(B) is a view showing an example of attribute information possessed by an object for forms.

FIG. 12 is a view showing an example of an additional information XML document.

FIG. 14 is a view showing an example of a collection policy.

FIG. 15 is a view showing an example of a condition description XML document.

FIG. 27 is an example of a top page displayed first when a user of the folder shown in FIG. 26 logs in.

FIG. 28 is a view showing an example of a template executed when the folder "All-companies" shown in FIG. 19 is accessed.

FIG. 29 is a view showing an example of a page created when the template shown in FIG. 28 is executed.

FIG. 31 is an example of a page created when the hot text "Tokyo" is designated on the screen shown in FIG. 30.

FIG. 33 is an example of a page created when the hot text "A Company" is designated on the screen shown in FIG. 32.

DESCRIPTION OF THE PREFERRED EMBODIMENTS

An embodiment of the present invention will now be described.

Figure 1:
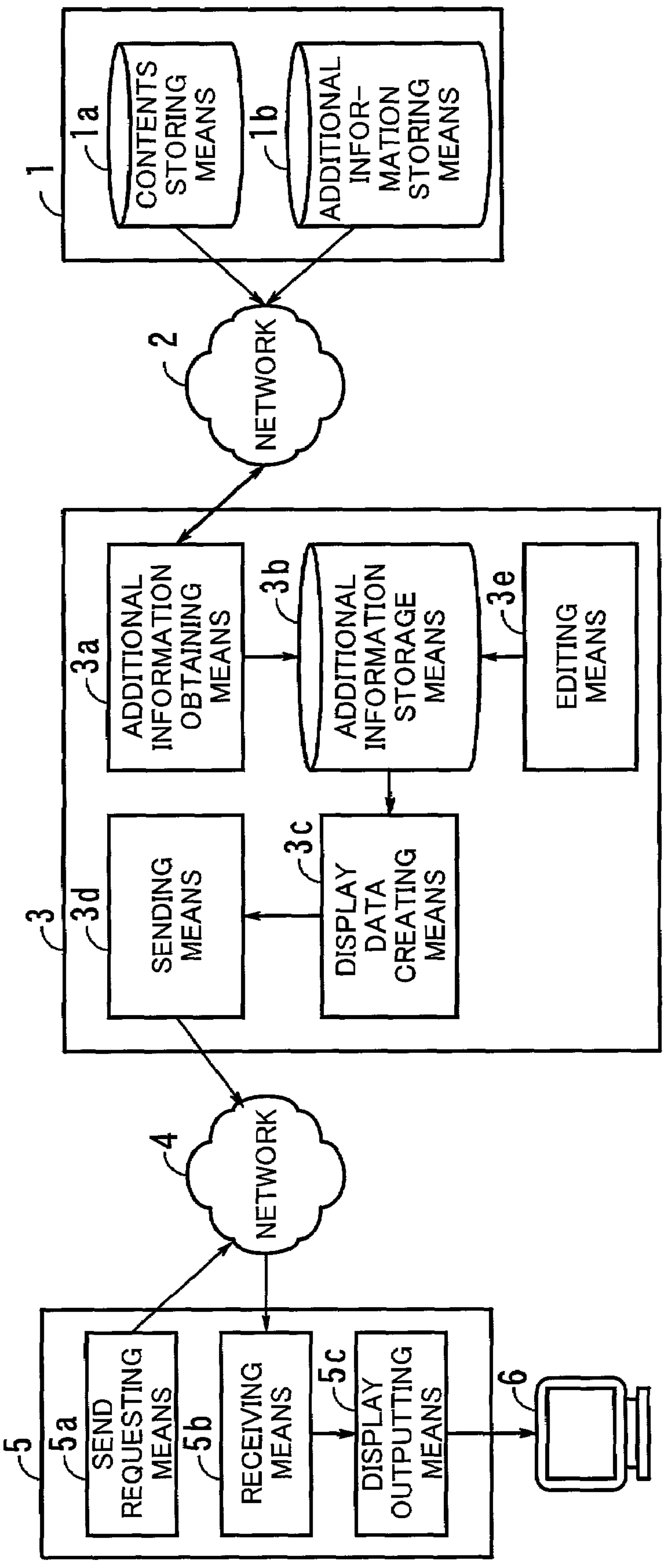
FIG. 1 is a view for describing the operating principle of the present invention.

FIG. 1 is a view for describing the operating principle of the present invention. In FIG. 1, an information disclosing server 1 discloses contents to a client 5. A portal server 3 obtains information regarding contents from the information disclosing server 1 and provides it to each client. The client 5 obtains display data created by the portal server 3 and displays it.

The information disclosing server 1 comprises contents storing means 1*a* and additional information storing means 1*b*.

The contents storing means la stores contents consisting of information, services, or the like.

The additional information storing means 1*b* stores additional information indicating the respective attributes of contents to be disclosed of contents stored in the contents storing means 1*a* and relations among the contents to be disclosed.

The portal server 3 comprises additional information obtaining means 3*a*, additional information storage means 3*b*, display data creating means 3*c*, sending means 3*d*, and editing means 3*e*.

The additional information obtaining means 3*a* obtains additional information stored in the additional information storing means 1*b* in the information disclosing server 1 by a predetermined method.

The additional information storage means 3*b* stores additional information obtained by the additional information obtaining means 3*a*.

If a request is made from a predetermined client, the display data creating means 3*c* obtains the appropriate additional information from the additional information storage means 3*b* and creates display data.

The sending means 3*d* sends display data created by the display data creating means 3*c* to the client which made a request.

The editing means 3*e* edits a folder which is created in the additional information storage means 3*b* and which stores additional information, a template (which will be described in detail later), and its arguments.

The client 5 comprises send requesting means 5*a*, receiving means 5*b*, and display outputting means 5*c*.

The send requesting means 5*a* requests the portal server 3 to send predetermined display data.

The receiving means 5*b* receives display data sent from the portal server 3 as a result of a request from the send requesting means 5*a*.

The display outputting means 5*c* outputs display data received by the receiving means 5*b*.

Now, operation in FIG. 1 will be described.

The administrator of the information disclosing server 1 stores contents to be disclosed in the contents storing means 1*a* and stores the respective attributes of contents to be disclosed of the stored contents and relations among the contents to be disclosed in the additional information storing means 1*b* as additional information.

The additional information obtaining means 3*a* in the portal server 3 accesses the information disclosing server 1 at predetermined intervals and obtains additional information stored in the additional information storing means 1*b*. The additional information storage means 3*b* creates folders corresponding to the logical structure of contents and stores the attributes of contents in each folder.

Figure 2:
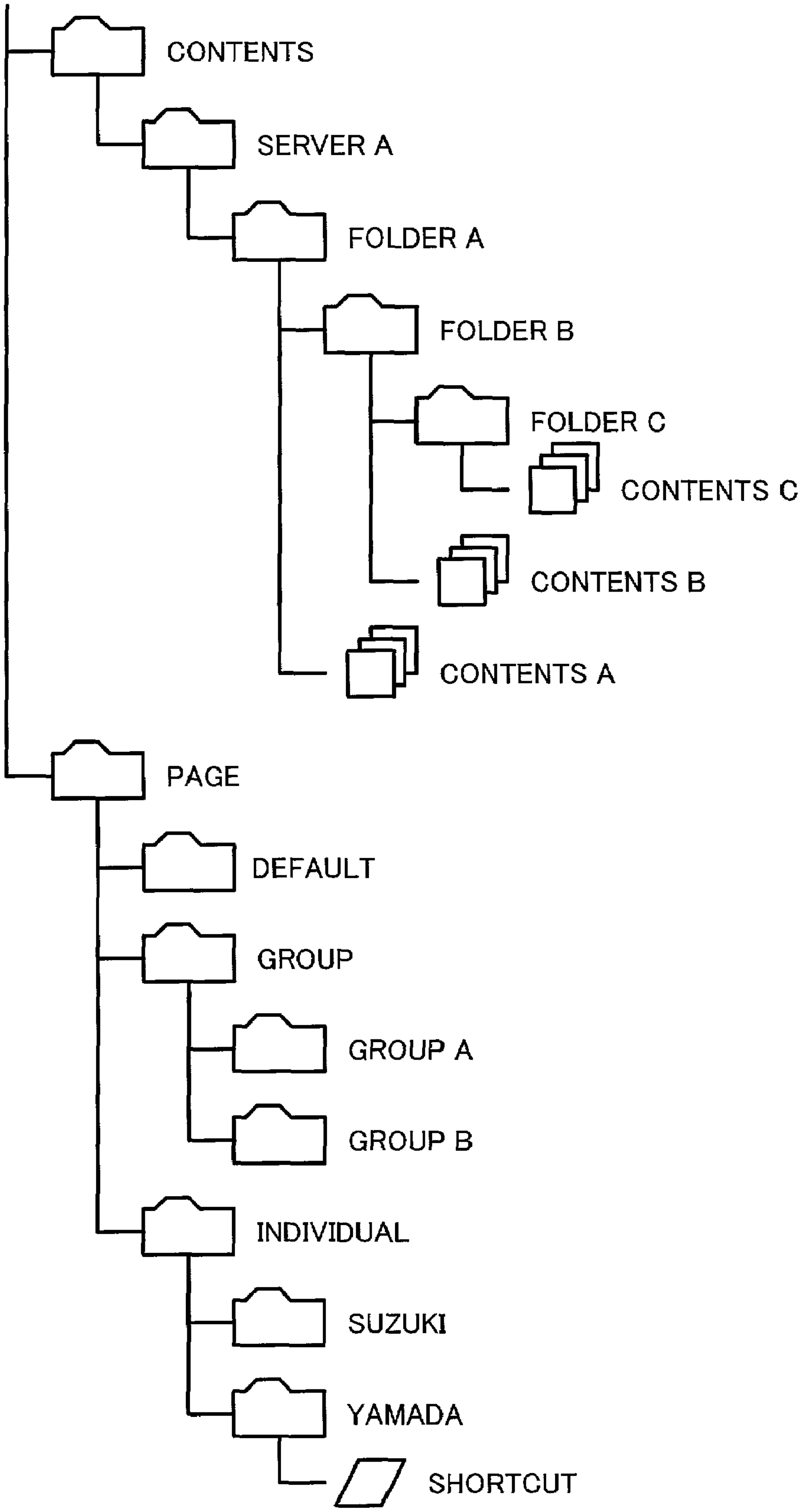
FIG. 2 is a view showing an example of information stored in the additional information storage means in the portal server shown in FIG. 1.

FIG. 2 is a view showing an example of information stored in the additional information storage means 3*b* in the portal server 3. In this example, information obtained from the information disclosing server 1 is stored under the folder "Contents" and information necessary for displaying information obtained on the client side (information for creating display data) is stored under the folder "Page".

Information obtained from the information disclosing server 1 is stored in the folder "Server A" directly under the folder "Contents." In this example, folders A, B, and C which store contents A, B, and C respectively are stored. This hierarchical structure is generated from logical structure possessed by additional information stored on the information disclosing server 1.

Under the folder "Page," information for customizing, in the case of information stored in the folder "Contents" being displayed on a display device 6 for the client 5, its format and contents according to users is stored. To be concrete, information regarding the default state provided by the portal server 3 is stored in the folder "Default." Under the folder "Group," information for customizing according to groups is stored. For example, if a user who belongs to group A accesses, a page will be created according to the contents of the folder "Group A." Furthermore, the folder "Individual" stores information for customizing display contents according to individuals.

Each folder stores attributes regarding its contents, information for designating a template being a model used to create a page from contents, and arguments provided to a template. The portal server 3 creates a page (display data) by providing arguments to a template designated and executing it.

The administrator or a user of the portal server 3 can change the format of a page displayed on the client 5 side by editing, via the editing means 3*e*, a folder, template, and argument stored in the additional information storage means 3*b*.

For example, the administrator of the portal server 3 can create new folder D under folder C, change the order of folders, or remove an unnecessary folder. Moreover, he/she can create a shortcut so that reference to another folder is made from a folder. He/she can edit not only a folder but also a template associated with each folder and an argument stored in folders. By doing so, he/she can change display contents. For example, by changing a template to use, he/she can display contents in the form of a list or in divided frames. He/she can change display contents by editing an argument.

A user of the portal server 3 can also edit display contents for his/her own folder in the same way that was described above. For example, user "Yamada" can create a new folder under his/her own folder "Yamada," or refer to the contents of another folder by creating a shortcut. Furthermore, he/she can change display contents by editing a template or argument.

Such editing work can be done easily by the use of a graphical user interface (GUI) provided by the editing means 3*e*.

By performing the above processes, preparations on the portal server 3 will be completed. In this state of things, it is assumed that a predetermined user has logged in via the client 5. Then the portal server 3 performs an authentication process. If he/she is a true user, then the portal server 3 confirms whether he/she possesses a personal folder. For example, if user "Yamada" has accessed, the folder "Yamada" exists, so the portal server 3 judges that his/her personal folder exists. If his/her personal folder does not exist, then the portal server 3 judges whether a folder for his/her group exists. If it does not exist, then the default folder is judged a target folder.

The portal server 3 obtains a template associated with the appropriate folder and an argument and creates a page. Contents themselves are stored in the information disclosing server 1, so a uniform resource locator (URL), for example, is embedded in a portion which refers to the contents.

The page created is sent via the sending means 3*d* to the client 5 which made a request.

In the client 5, the receiving means 5*b* receives the page sent, obtains contents from the information disclosing server 1 at need, and provides them to the display outputting means 5*c* to cause them to be output on the display device 6.

As described above, in an information processing system according to the present invention, the information disclosing server 1 stores additional information indicating the attributes and logical structure of contents and the portal server 3 obtains this additional information and creates a folder corresponding to it. The administrator or each user of the portal server 3 therefore can edit a page easily.

Furthermore, a template is assigned to each folder and an argument is stored in that folder. As a result, the contents of a page displayed can be changed easily by selecting a template or changing an argument.

Moreover, only attribute information is obtained and stored. This will prevent network congestion and enable to reduce memory capacity, compared with a case where all pieces of information are obtained and stored.

An embodiment of the present invention will now be described with reference to FIG. 3.

Figure 3:
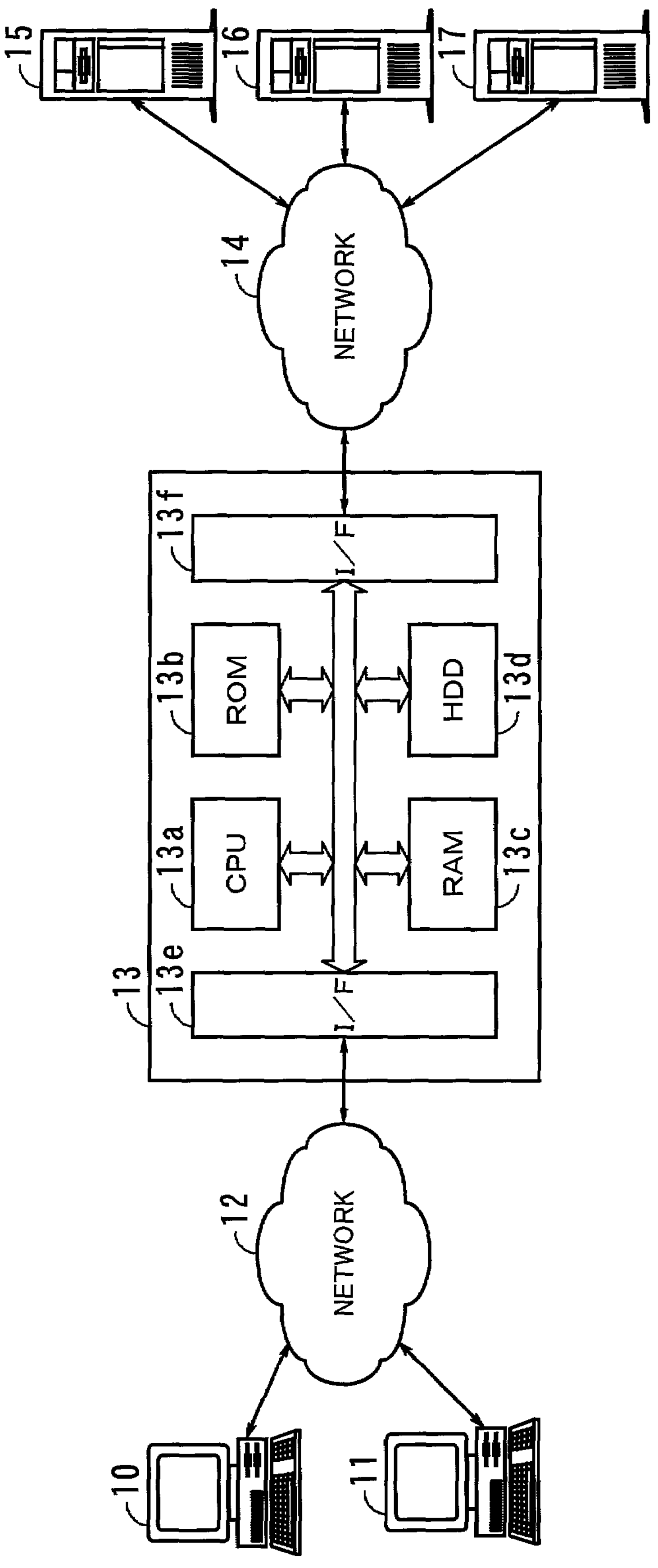
FIG. 3 is a view showing the configuration of an embodiment of the present invention.

As shown in FIG. 3, an information processing system according to the present invention comprises clients 10 and 11, networks 12 and 14, a portal server 13, and information disclosing servers 15 through 17. The configuration of the clients 10 and 11 and information disclosing servers 15 through 17 is the same as that of the portal server 13, so descriptions of them will be omitted.

The portal server 13 comprises a central processing unit (CPU) 13*a*, a read only memory (ROM) 13*b*, a random access memory (RAM) 13*c*, a hard disk drive (HDD) 13*d*, and interfaces (I/F) 13*e* and 13*f*.

The CPU 13*a* controls each section of the apparatus and carries out various operations, in compliance with programs stored in the HDD 13*d*.

The ROM 13*b* stores basic programs executed by the CPU 13*a*.

The RAM 13*c* temporarily stores programs being executed by the CPU 13*a* and data being operated by the CPU 13*a*.

The HDD 13*d* stores programs executed by the CPU 13*a* and information obtained from the information disclosing servers 15 through 17.

The I/F 13*e* performs data protocol or format conversion when it sends data to and receives data from the clients 10 and 11 via the network 12.

The I/F 13*f* performs data protocol or format conversion when it sends data to and receives data from the information disclosing servers 15 through 17 via the network 14.

Figure 4:
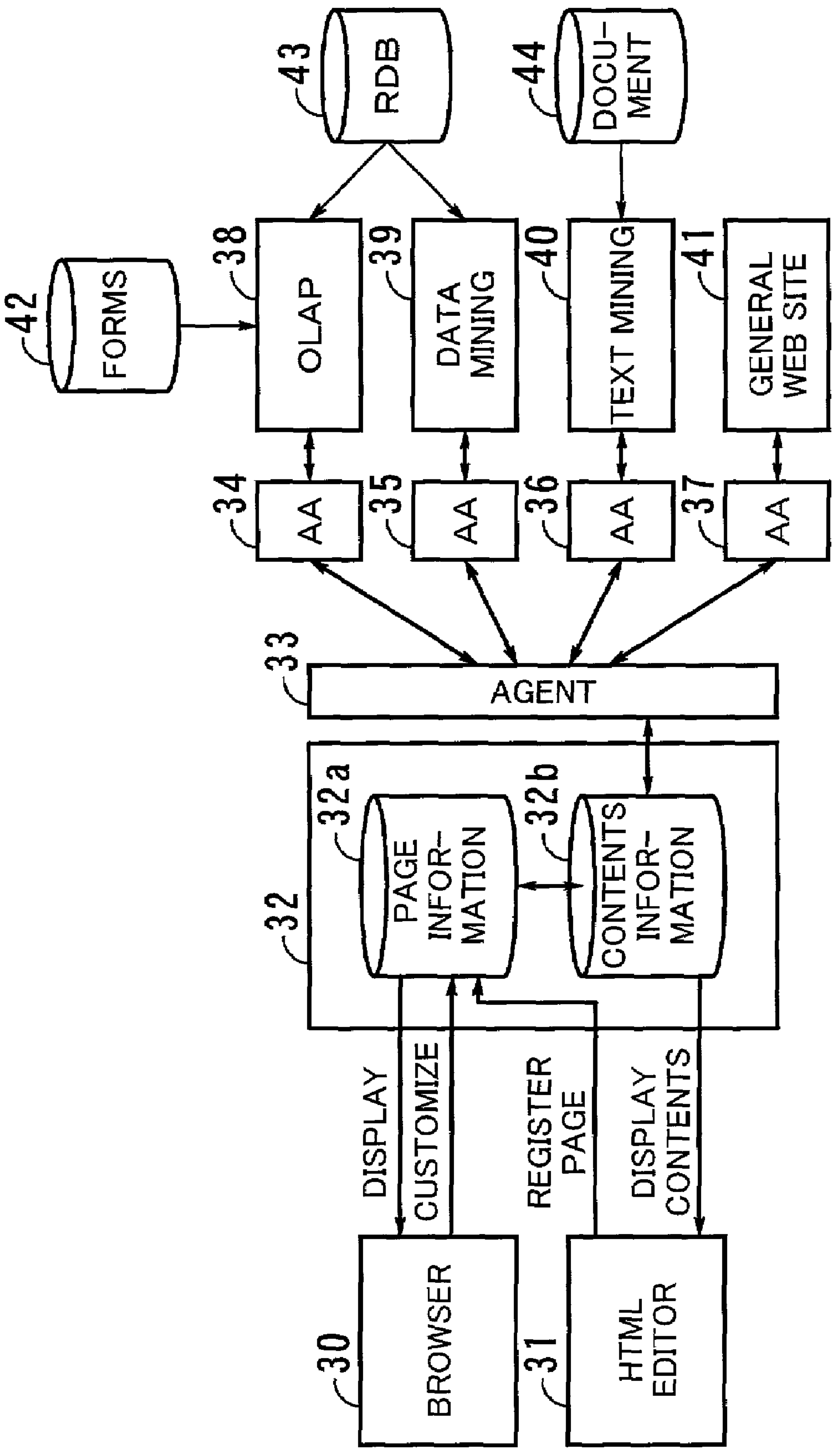
FIG. 4 is a schematic view showing relations among pieces of software in the embodiment shown in FIG. 3.

FIG. 4 is a schematic view showing relations among pieces of software in the above embodiment.

As shown in FIG. 4, a browser 30 or HTML editor 31 is implemented on the clients 10 and 11.

A database 32 and agent 33 are implemented on the portal server 13. The database 32 stores page information 32*a* and contents information 32*b*.

Agent adapters (AA) 34 through 37, online analytical processing (OLAP) 38, data mining 39, text mining 40, a general Web site 41, forms 42, a relational database (RDB) 43, and a document 44 are implemented on the information disclosing servers 15 through 17.

The OLAP 38 analyzes aggregate data stored in the forms 42 or RDB 43 in an arbitrary way.

The data mining 39 finds out useful information from among the pieces of data stored in the RDB 43.

The text mining 40 summarizes and outputs a valuable notion or knowledge from among the desired pieces of text data stored in the document 44.

The general Web site 41 holds a document described in HTML.

The AAs 34 through 37 store a document (additional information XML document) in which additional information indicating the respective attributes of contents and relations among the contents, which were collected by the OLAP 38 etc., is described in the extended markup language (XML), and provide it at the request of the agent 33.

The agent 33 obtains an additional information XML document from each of the AAs 34 through 37 at predetermined dates and hours.

The contents information 32*b* stored in the database 32 contains additional information XML documents obtained from the information disclosing servers 15 through 17 by the agent 33.

The page information 32*a* contains information regarding customization etc. performed when a page is created from the contents information 32*b*.

The browser 30 is used by a user to access the portal server 13, to make a request to send a page, and to display information obtained.

The HTML editor 31 is used by a user to edit the contents of a page displayed.

Now, operation in the above embodiment will be described. Descriptions of the operation of a system will be given in the following order:

(1) Type of information stored in the information disclosing servers (2) Procedure for registering an information disclosing server with the portal server (3) Procedure used by the portal server for collecting information from the information disclosing servers (4) Procedure on the portal server for editing a page (5) Procedure for accessing the portal server from a client First, Section 1, "Type of information stored in the information disclosing servers" will be described.

(1) Type of Information Stored in the Information Disclosing Servers

The information disclosing servers 15 through 17 store the following information:

(A) General contents (B) Form access contents (C) Event (D) Applet (E) Parameter object First, information possessed by all contents will be described.

FIG. 5 is an example of attribute information possessed by all contents. As shown in FIG. 5, contents possess Name, Type, Representation, Comment, and Update Time as attribute information. Name is an identifier for identifying contents. Type indicates the type of contents (HTML, applet, etc.). Representation indicates the representation of contents in HTML. Comment is a description etc. of contents. Update Time indicates the date and hour when contents were updated.

Then "(A) General contents" will be described.

General contents are the commonest contents and can be accessed by a URL. As shown in FIG. 6, general contents possess URL, Caption, and Explanatory Sentence as attribute information. URL is an address used to designate a location where a resource is stored in the case of accessing a page. Caption indicates a character string (hot text) etc. linked. Explanatory Sentence is a description etc. of contents.

Then "(B) Form access contents" will be described.

Form access contents are contents which open when a user has entered information in a form. A search service page is an example of form access contents. Their default representation format is a form and entry fields designated by arguments are arranged in order in a form. As shown in FIG. 7(A), these form access contents possess URL and Argument as attribute information. As shown in FIG. 7(B), an argument consists of Argument Name, Type, and Defined Value. Argument Name is the name of an argument. Type indicates the type (TEXT, for example) of an argument. Defined Value indicates a defined value for an argument. With the form access contents, entry history can be retained according to users.

"(C) Event" will now be described.

An event is generated in a special format at a site which an information provider manages. As shown in FIG. 8, an event possesses Classification, Server, Key, Contents of Notice, Expire, Forced Mode, and Notice Destination as attribute information.

Classification consists of an alarm, update, status, a user definition, and the like. Server is a server which issues an event. Key is an identifier for specifying an event. Contents of Notice indicates whether the contents of notice are a text or flag. Expire indicates the date and hour when an event becomes invalid. If a user does not make a selection, Forced Mode indicates whether notice is required. Notice Destination is a list of users or groups to which notice is sent.

"(D) Applet" will now be described.

An applet is different from other contents in usage. It is intended that other contents should be shown to a user without being changed, while an applet is used by an information intermediary as a tool for creating his/her own page. As shown in FIG. 9(A), attribute information possessed by an applet consists of Class, Width, Height, and Argument information. Class is the name of a class file for an applet. Width indicates the width of an applet displayed. Height indicates the height of an applet displayed. Argument Information is information regarding an argument and is provided according to the number of arguments.

FIG. 9(B) shows an example of Argument Information. It consists of Name, Value, and Comment. Name is the name of an argument. Value is the value of an argument. Comment is a comment, such as a description, about an argument.

"(E) Parameter object" will now be described.

A parameter object is one used as an argument for an applet etc. As shown in FIG. 10(A), a parameter object possesses Applicable Object, Name, Value, and Comment as attribute information. Applicable Object is a list of applet objects which can use the object in question as an argument. Name is the name of an argument. Value is the value of an argument. Comment is a description etc. of an object.

A dedicated object for forms is provided. FIG. 10(B) shows an example of information possessed by this object. As shown in FIG. 10(B), an object for forms possesses Acquisition Format, Version Number, and Update Time for Each Version as attribute information. Acquisition Format is a file format. Version Number indicates the number of a version which can be acquired. Update Time for Each Version indicates the date and hour when each version was updated.

(2) Procedure for Registering an Information Disclosing Server with the Portal Server The portal server 13 accesses an information disclosing server which was registered in advance, and collects additional information. Therefore, if a new information disclosing server is added, it must be registered.

As a first step in the registration process, an XML document which describes the attribute and logical structure of contents to be disclosed must be created and registered. XML is widely used, so the reason for using an XML document is to make it easy to create additional information. A method for creating additional information will now be described by the use of a concrete example.

Figure 11:
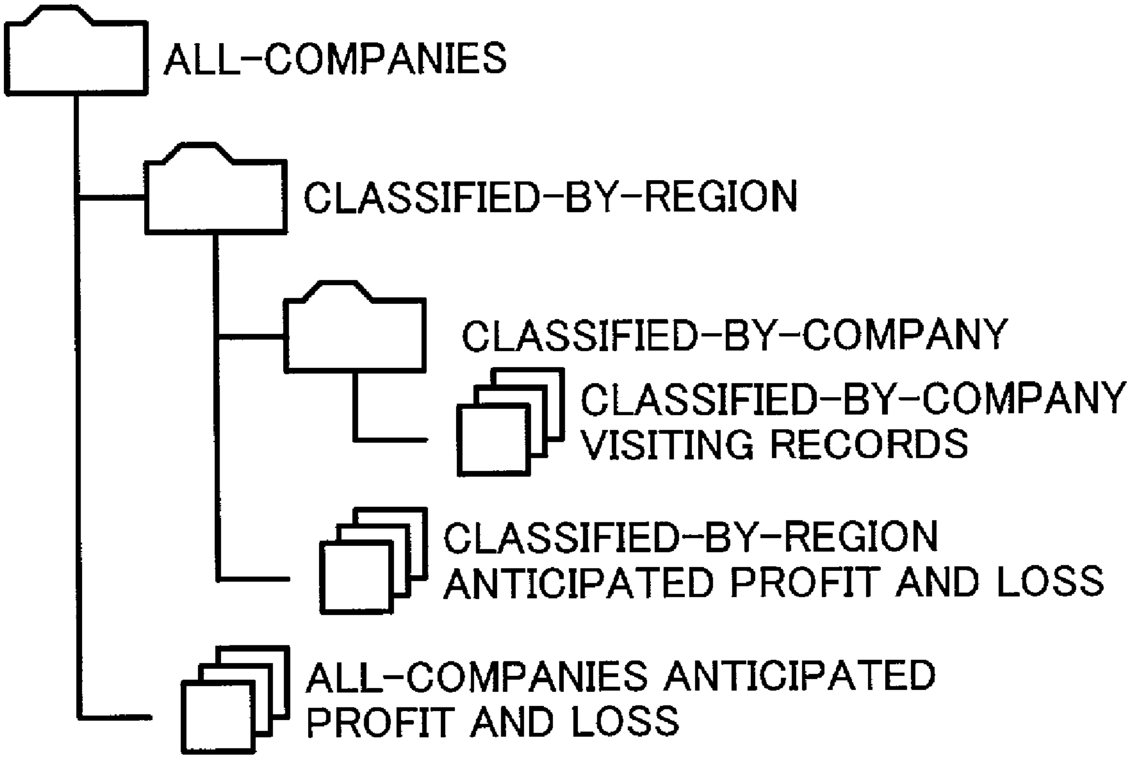
FIG. 11 is a view showing an example of information to be disclosed by an information disclosing server.

FIG. 11 shows an example of information to be disclosed by an information disclosing server. In this example, the folder "All-companies" stores the folder "Classified-by-region" and the contents "All-companies anticipated profit and loss." The folder "Classified-by-region" stores the folder "Classified-by-company" and the contents "Classified-by-region anticipated profit and loss." Furthermore, the folder "Classified-by-company" stores the contents "Classified-by-company visiting records." Now, information associated with the above information and the respective details of the contents will be described.

1) Sales Data (Information)

Sales data is numerical data for calculating classified-by-company anticipated profit and loss or classified-by-region anticipated profit and loss and is stored in a database. This information itself is not managed as contents information. Therefore, relations between this information and attribute information, other pieces of information, and services are not managed.

2) Visiting Diary (Information)

A visiting diary is document data and records the history of the visits of customers (companies). This information itself is not managed as contents information. Therefore, relations between this information and attribute information, other pieces of information, and services are not managed.

3) All-companies Profit and Loss Anticipating Applet (Service)

This applet performs OLAP for calculating all-companies anticipated profit and loss with sales data described in 1) as input and displays the results as forms. Information (database name, for example) for accessing a target database is described in the applet. Attribute information and related information are as follows:

Attribute Information

Name: all-companies profit and loss anticipating APPLET
Type: APPLET
Class: soneki.zensha
Width: 300
Height: 200
Argument information: no argument
Comment: display all-companies anticipated profit and loss with sales data as input
Update time: 04-01-2000

Related Information classified-by-region profit and loss anticipating applet as a child 4) Classified-by-region Profit and Loss Anticipating Applet (Service)

This applet performs OLAP for calculating classified-by-region anticipated profit and loss with a region name, which is clicked (selected) when 3) is displayed, and sales data described in 1) as input and displays the results as forms. Information (database name, for example) for accessing a target database is described in the applet. Attribute information and related information are as follows:

Attribute Information

Name: classified-by-region profit and loss anticipating APPLET
Type: APPLET
Class: soneki.chikubetsu
Width: 300
Height: 200
Argument information:
Name: region name
Value:
Comment: designate a region name
Comment: display classified-by-region anticipated profit and loss with sales data as input
Update time: 04-01-2000

Related Information

Classified-by-company visiting record displaying applet as a child

5) Classified-by-company Visiting Record Displaying Applet (Service)

This applet searches documents for the classified-by-company visiting record with a company name, which is clicked (selected) when 3) is displayed, and a visiting diary described in 2) as input and displays the results. Information (database name and file name, for example) for accessing a visiting diary is described in the applet. Attribute information and related information are as follows:

Attribute Information

Name: classified-by-company visiting record displaying APPLET
Type: APPLET
Class: soneki.houmon.kaisha
Width: 300
Height: 200
Argument information:
Name: company name
Value:
Comment: designate a company name
Comment: display a classified-by-company visiting record with a company name as input
Update time: 04-01-2000

Related Information none

FIG. 12 shows an additional information XML document created by the administrator of an information disclosing server on the basis of the above contents.

As shown in FIG. 12, parent-child relationships between contents are described by logical structure among tags in the XML document. Such an XML document is created by the administrator of an information disclosing server and is stored in its predetermined folder.

Such an XML document can be created automatically by a program etc. For example, the method of performing a procedure shown in FIG. 18, which will be described later, or the method of referring to information stored in the table of contents (TOC) of a database and converting its logical structure to an XML document may be used.

Figure 13:
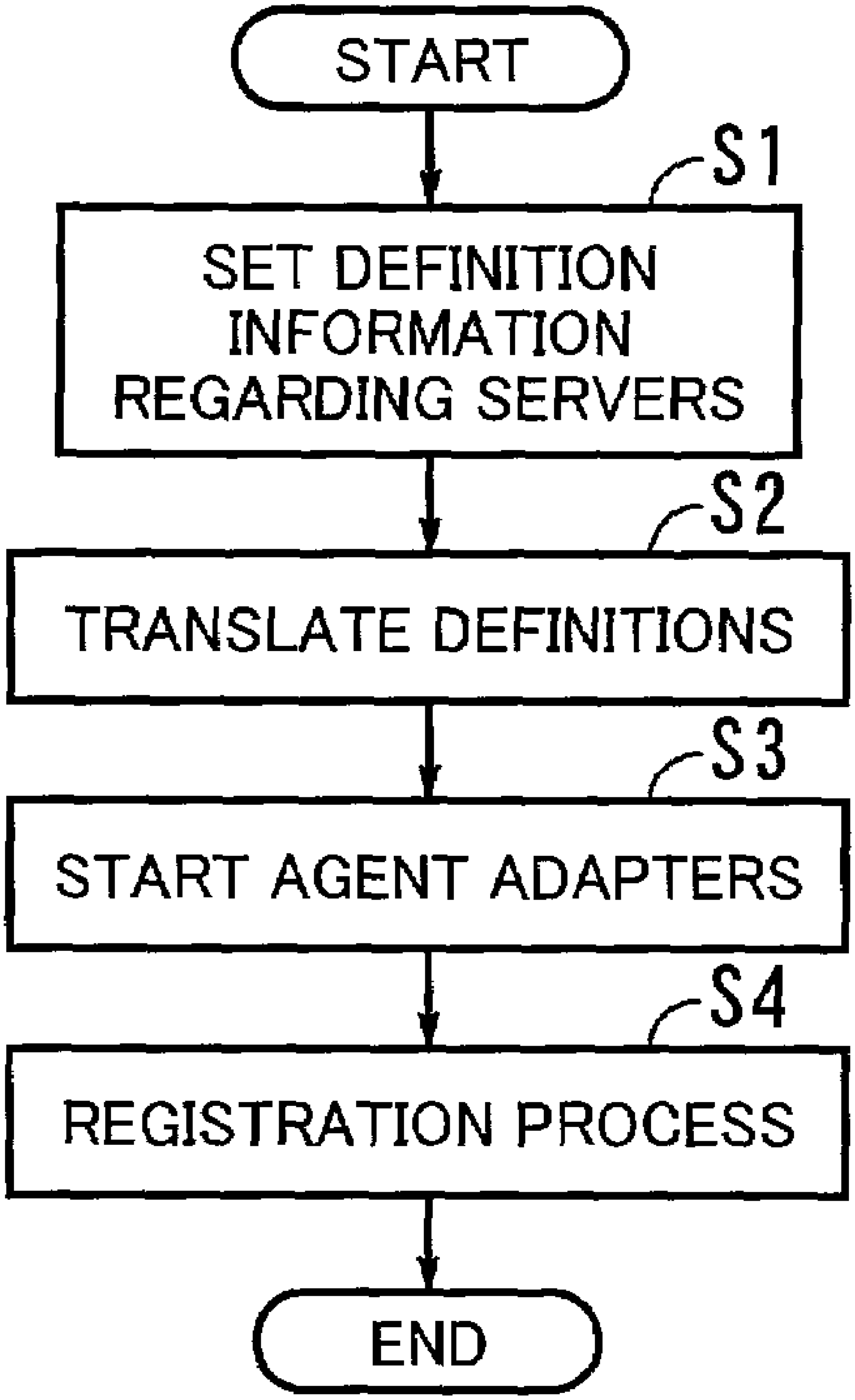
FIG. 13 is a flow chart for describing an example of a process for registering an information disclosing server with a portal server.

After an XML document being created and registered, a process for registering an information disclosing server with the portal server 13 will be performed in compliance with a flow chart shown in FIG. 13. As a result, the following procedure will be performed.

[S1] Set definition information regarding the information disclosing servers. This definition information includes a server name, agent adapter names, a server function name, a data record format on the server, a user-registered dictionary (ontology) name, agent adapter names, and an input-output interface to the agent adapter.

[S2] Translate the definitions set in step S1 and convert the results to information which an agent system can understand (agent system information).

[S3] Start the agent adapters.

[S4] Register definition information regarding the agent adapter with the agent 33. In this case, whether there are agent adapters with the same name, for example, is also checked.

After the registration, an information collection policy for the agent is set.

The agent collects additional information on the basis of information registered in advance (information collection policy), so the administrator of the portal server must create and register an information collection policy in advance.

Information collected is stored in a designated folder on the portal server. Therefore, by setting a collection policy for this folder, a method for collecting information can be designated.

FIG. 14 is a view showing an example of an information collection policy. In this example, Contents Type, Collect All Information, and Collect Change Information are shown as set items. Contents Type designates the type of contents to be collected. A plurality of contents can be designated. Collect All Information designates the date and hour when all pieces of information are collected. Collect Change Information designates the date and hour when change information is collected.

Change information to be collected is as follows:

(A) Creation of a new folder (B) Removal of a folder (including a subfolder)

(C) Creation of a new contents object (D) Removal of a contents object (E) Change in the contents of a contents object An information collection policy is set in the above way and a condition description XML document, for example, shown in FIG. 15 is created and provided to the agent 33. In this example, information between the tag <statement> and the tag </statement> indicates a collection policy. This example is one for collecting all pieces of information, so collection conditions etc. are not set.

Figure 16:
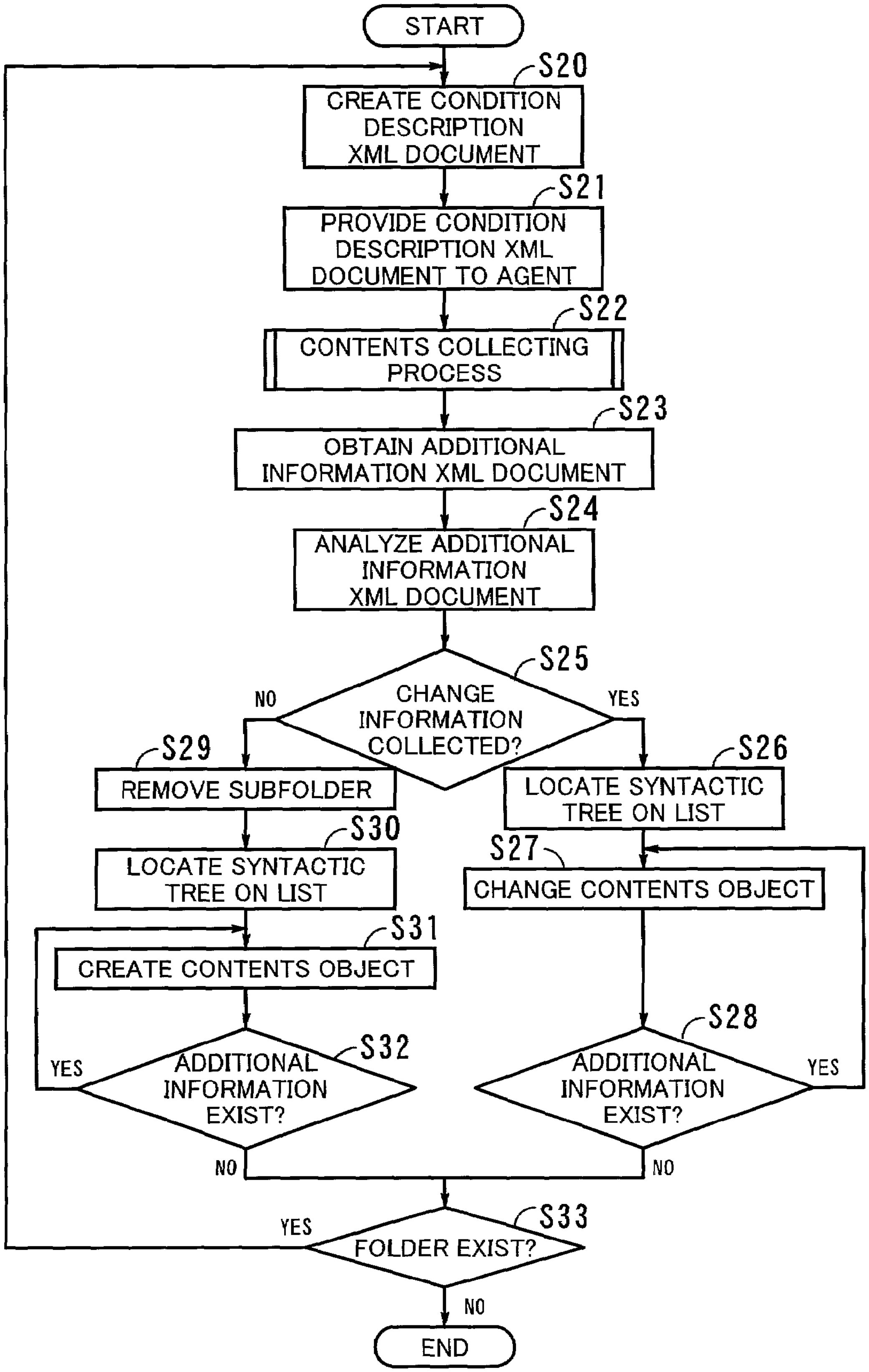
FIG. 16 is a flow chart for describing an example of a process for collecting information from an information disclosing server.
Figure 17:
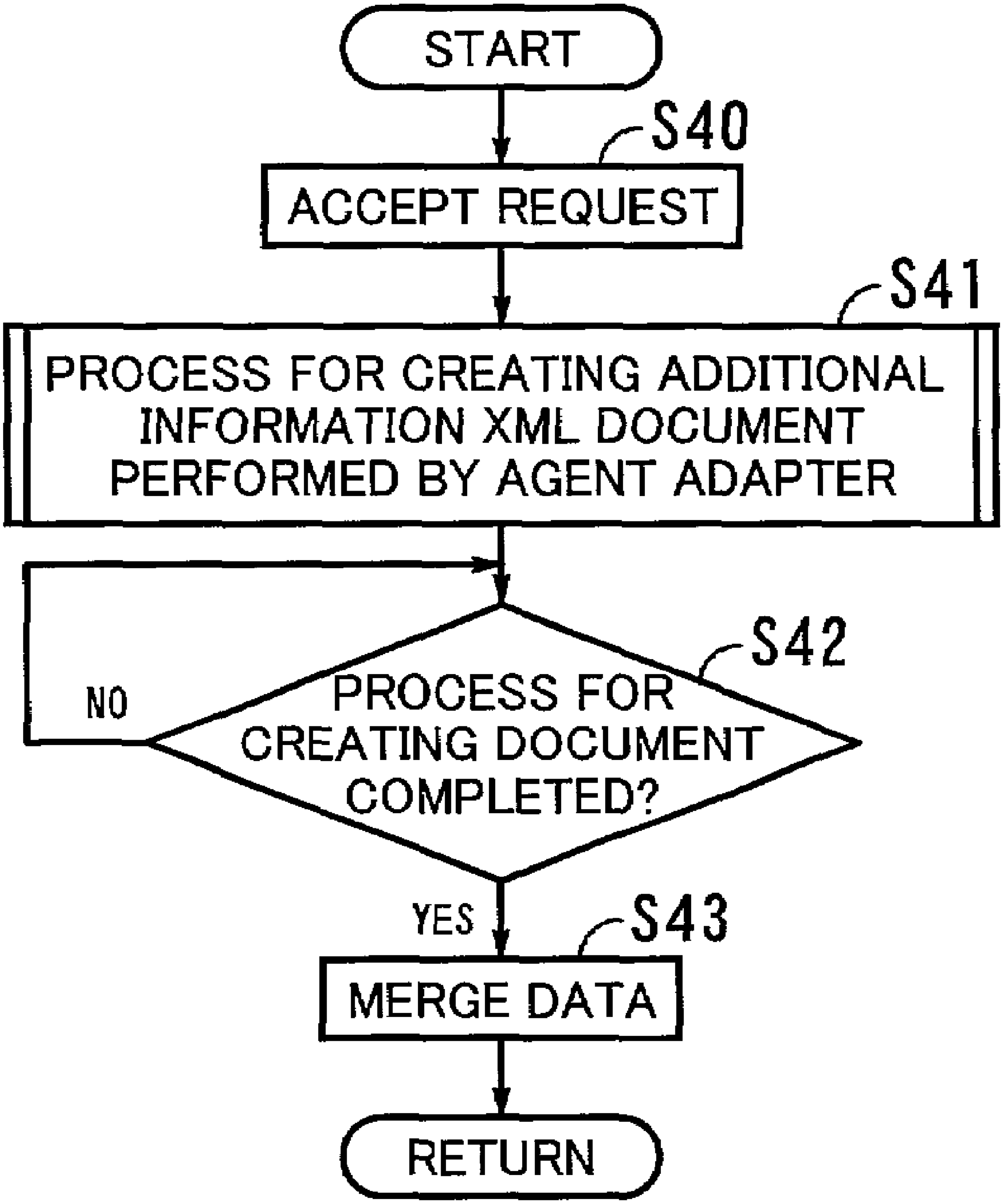
FIG. 17 is a flow chart for describing in detail the "contents collecting process" shown in FIG. 16.
Figure 18:
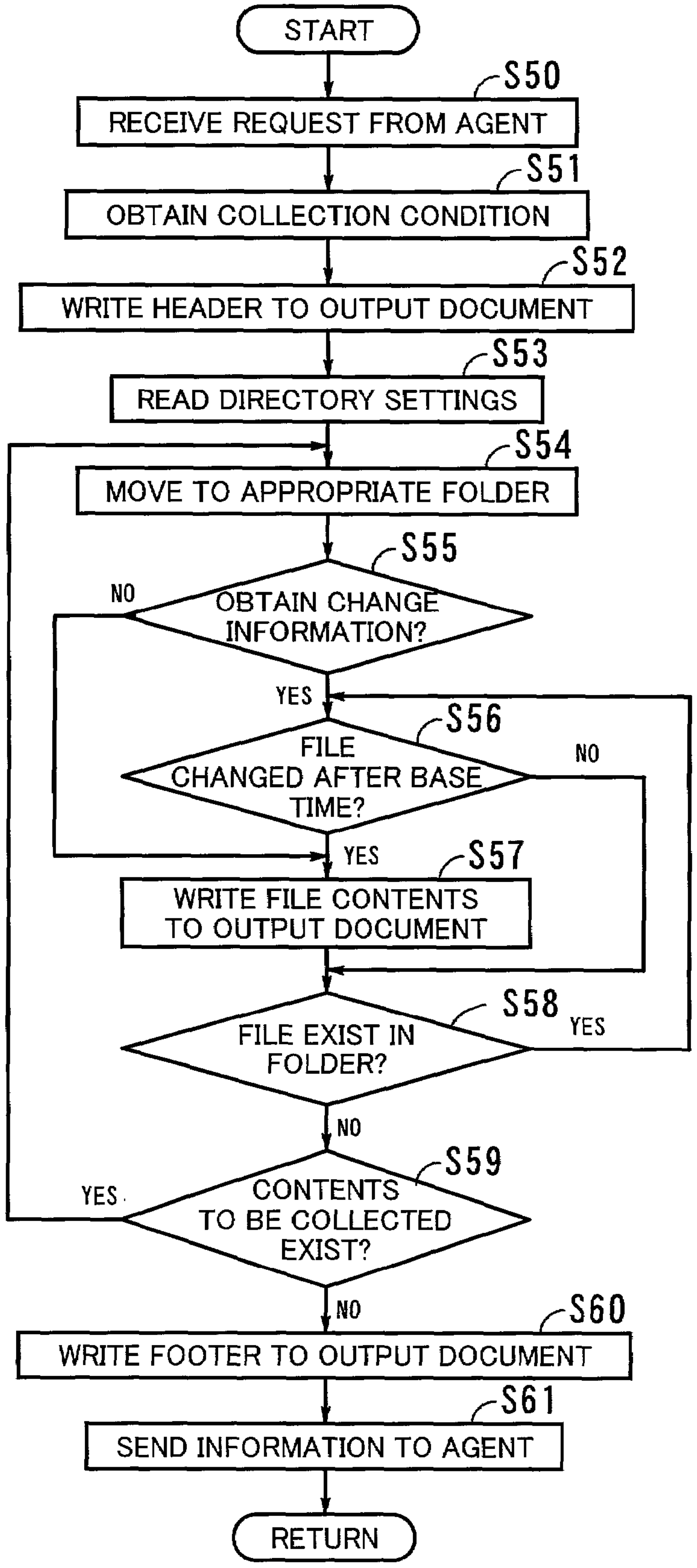
FIG. 18 is a flow chart for describing in detail the "additional information collecting process by agent adapter" shown in FIG. 17.

(3) Procedure Used by the Portal Server for Collecting Information from the Information Disclosing Servers After definition information regarding the information disclosing servers and an information collection policy being registered, the agent 33 collects information from the information disclosing servers 15 through 17 in compliance with registered contents. FIGS. 16 through 18 are examples of a process for collecting information from an information disclosing server. FIG. 16 is a main flowchart. The following procedure will be performed in compliance with this flow chart.

[S20] The portal server reads out information collection conditions (FIG. 14) from a folder corresponding to an information disclosing server from which it tries to collect information and creates a condition description XML document (see FIG. 15).

[S21] The portal server provides the condition description XML document to the agent 33 and makes a request to collect contents.

[S22] The agent 33 performs a process for collecting the contents. This process will be described in detail later with reference to FIG. 17.

[S23] The portal server obtains collected additional information XML documents (see FIG. 12) from the agent 33.

[S24] The portal server analyzes the additional information XML documents with a general-purpose XML parser and obtains a syntactic tree as analysis results.

[S25] The portal server judges whether or not the collection condition that change information should be collected is imposed. If the collection condition that change information should be collected is imposed, the portal server proceeds to step S26. If the collection condition that change information should be collected is not imposed, the portal server proceeds to step S29.

[S26] The portal server locates the syntactic tree on a change information list. That is to say, the portal server specifies the appropriate folder.

[S27] The portal server obtains additional information changed and changes the appropriate contents object.

[S28] The portal server judges whether there still exists additional information changed. If there still exists additional information changed, the portal server returns to step S27. If there is no additional information changed, the portal server proceeds to step S33.

[S29] The portal server removes a subfolder.

[S30] The portal server locates the syntactic tree on an attribute information list.

[S31] The portal server obtains additional information and creates a contents object.

[S32] The portal server judges whether there still exists additional information. If there still exists additional information, the portal server returns to step S31. If there is no additional information, the portal server proceeds to step S33.

[S33] The portal server judges whether there still exists a folder to be processed. If there still exists a folder to be processed, the portal server returns to step S20. If there is no folder to be processed, the portal server terminates the procedure.

By performing the above procedure, an attribute information XML document is obtained from a predetermined information disclosing server and, if change information is collected, only contents objects corresponding to contents changed will be changed. If all pieces of information are collected, all folders are removed and then new contents objects are created. In this case, a contents object refers to a folder and attribute information.

Now, the contents collecting procedure shown in FIG. 16 will be described in detail with reference to FIG. 17. The following procedure will be performed in compliance with this flow chart.

[S40] The agent 33 accepts a request from the portal server 13 and sends the request to an agent adapter to be searched.

[S41] The agent adapter performs a process for creating an additional information XML document. This process will be described in detail later with reference to FIG. 18.

[S42] The agent 33 judges whether the agent adapter has completed a process for creating an additional information XML document. If the agent adapter has completed a process for creating an additional information XML document, the agent 33 proceeds to step S43. If the agent adapter has not completed a process for creating an additional information XML document, the agent 33 repeats the same process.

[S43] The agent 33 merges and sorts data in designated order which it collected.

The above procedure enables the agent 33 to obtain an additional information XML document from an agent adapter and to merge data.

Now, the contents collecting procedure by an agent adapter shown in FIG. 17 will be described in detail with reference to FIG. 18. This process is performed by an agent adapter. The following procedure will be performed in compliance with this flow chart.

[S50] An agent adapter receives a request to send from the agent.

[S51] The agent adapter obtains a collection condition (see FIG. 15).

[S52] The agent adapter writes header information indicating, for example, whether there is an error to an additional information XML document, being an output document.

[S53] The agent adapter reads directory settings from an environment setting file which describes environment setting situations regarding the information disclosing servers.

[S54] The agent adapter moves to a folder from which it obtains attribute information.

[S55] If the agent adapter obtains change information, it proceeds to step S56. If the agent adapter does not obtain change information, it proceeds to step S57.

[S56] If a file to be obtained was changed after the base time when the file should be obtained, the agent adapter proceeds to step S57. In other cases,the agent adapter proceeds to step S58.

[S57] The agent adapter writes the contents of the file to the additional information XML document, being an output document.

[S58] The agent adapter judges whether there is another file in the target folder. If there exists another file in the target folder, the agent adapter returns to step S56. If there exists no other file in the target folder, the agent adapter proceeds to step S59.

[S59] The agent adapter judges whether there exist other contents to be collected. If there exist other contents to be collected, the agent adapter returns to step S54. If there exist no other contents to be collected, the agent adapter proceeds to step S60.

[S60] The agent adapter writes a footer to the additional information XML document, being an output document.

[S61] The agent adapter sends the agent the additional information XML document it created.

The above procedure enables an agent adapter to collect attribute information from a predetermined folder according to a collection condition and to create an additional information XML document.

In the procedures shown in FIGS. 16 through 18, the agent 33 makes a request to each agent adapter for collection on the basis of a collection policy (see FIG. 14) and an agent adapter creates an additional information XML document in response to the request for collection and sends it to the agent. As a result, the portal server 13 will create a folder corresponding to the additional information XML document it obtained.

To give a concrete example, if an information disclosing server stores the contents shown in FIG. 11, the additional information XML document shown in FIG. 12 is created and sent to the agent. The portal server 13 which received this information creates a folder, for example, shown in FIG. 19.

In this example, the folders "Contents" and "Page" exist at the top layer. The folder "Contents" stores folders or contents (folder objects) created on the basis of an additional information XML document obtained from each information disclosing server. In this example, a group of folders corresponding to FIG. 11 are stored in the folder "Server A."

The folder "Page" stores customization information for creating a page on the basis of information stored in the folder "Contents" and the like. In this example, the folder "Default" storing default information for users who do not customize, the folder "Group" for users who customize by the group, and the folder "Individual" for users who customize by the individual are stored.

(4) Procedure on the Portal Server for Editing a Page

Information collected in the above way can be provided to the client side without being changed and be displayed. However, it is desirable that the administrator of the portal server 13 should edit information according to its quality, importance and the like. Furthermore, it is more desirable that each user can set display contents or a display method individually. Then various needs can be met.

In this embodiment, by using methods described below, the administrator of the portal server 13 can edit information obtained or a user can customize display contents or a display method.

Figure 20:
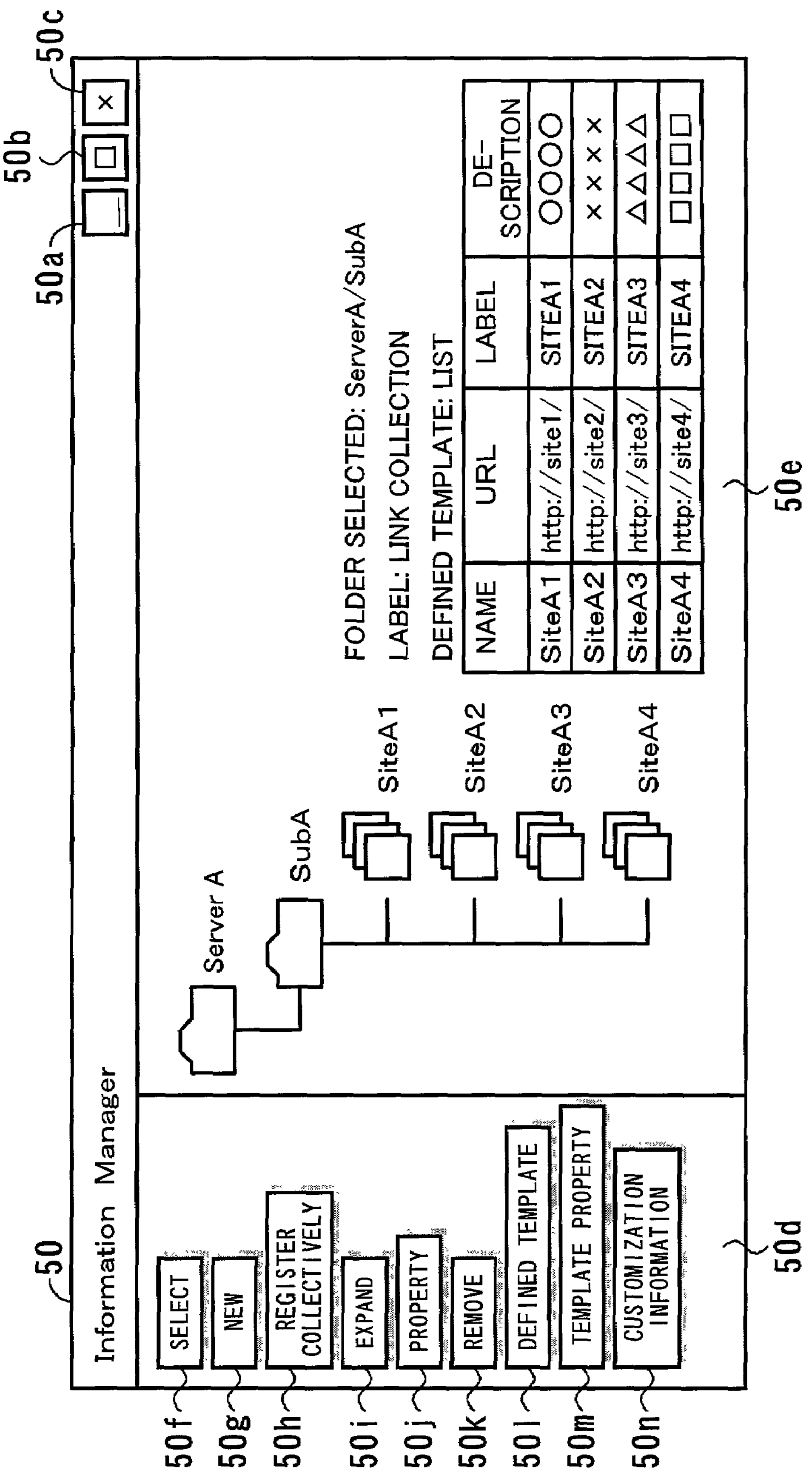
FIG. 20 is an example of a screen for editing a folder and contents.

FIG. 20 is an example of a screen for editing a folder and contents. In this example, a window 50 titled "Information Manager" is displayed. Buttons 50*a* through 50*c* operated to reduce, enlarge, and quit the window 50 respectively are displayed at the upper right corner of the window 50.

A display area of the window 50 consists of frames 50*d* and 50*e*. In the frame 50*d*, buttons 50*f* through 50*n* for editing are displayed. In the frame 50*e*, a folder and contents to be edited are displayed.

The Select button 50*f* is operated to select a folder or contents to be edited.

The New button 50*g* is operated to create a folder, contents, or a shortcut.

The Register Collectively button 50*h* is operated to register edited contents collectively.

The Expand button 50*i* is operated to expand and display folders or contents which belong to layers lower than a predetermined folder.

The Property button 50*j* is operated to display the property of a folder or contents selected. In this example, the property of the folder "SubA" is displayed in the lower right area of the frame 50*e*.

The Remove button 50*k* is operated to remove a folder or contents selected.

The Defined Template button 501 is operated to select a defined template as a template for the folder in question.

The Template Property button 50*m* is operated to edit the property of a template. When this button is operated, a screen shown in FIG. 21 will appear.

The Customization Information button 50*n* is operated to edit information for customizing. When this button is operated, a screen shown in FIG. 23 will appear.

On this screen, the administrator of the portal server 13 can edit a folder or contents to his/her purpose. Basic editing methods include removing, creating, and moving a contents object (folder and contents) and creating a shortcut.

Figure 21:
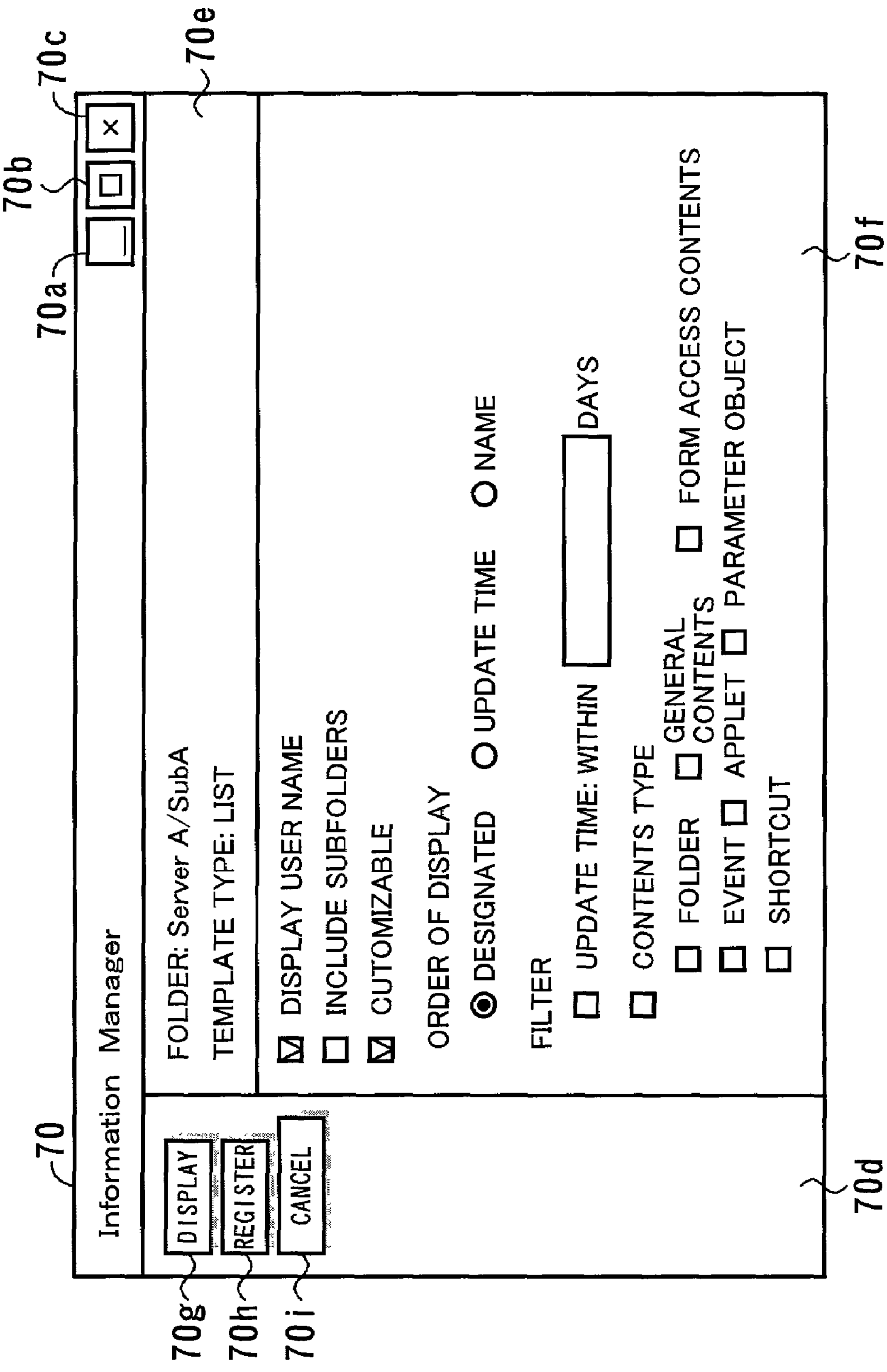
FIG. 21 is a view showing an example of a screen displayed when the Template Property button shown in FIG. 20 is operated.

When the Template Property button 50*m* shown in FIG. 20 is operated, the screen shown in FIG. 21 will appear.

In this example, a window 70 titled "Information Manager" is displayed. A display area of the window 70 consists of frames 70*d* through 70*f*.

In the frame 70*d*, buttons 70*g* through 70*i* for, for example, registering edited contents are displayed.

The Display button 70*g* is operated to display a page actually in accordance with set contents.

The Register button 70*h* is operated to register set contents.

The Cancel button 70*i* is operated to cancel set contents.

In the frame 70*e*, the name of a folder to be edited and the type of a template are displayed. In this example, the name of a folder to be edited is "Server A/SubA" and the type of a template is "list." With a list template, contents appear in list form. There is another template used to display contents by assigning them to a plurality of frames.

In the frame 70*f*, various items for setting are displayed. The first item "Display User Name" is used to designate whether to display the name of a user who logged in on a page. In this example, its box is checked, so a user name will be displayed.

The next item "Include Subfolders" is used to designate whether to display folders which belong to layers lower than a target folder.

The item "Customizable" is used to designate whether to permit a user to customize a page.

The item "Order Of Display" is used to designate the order in which contents are displayed. To be concrete, order designated by the administrator, order of update time, or order of name can be selected.

The item "Filter" is used to display contents. Filtering methods can be broadly divided into two types: filtering by update time, or filtering by the type of contents. Filtering by update time can be designated by entering a predetermined number of days in the appropriate text box.

If filtering by the type of contents is designated, “Folder,” “General contents,” “Form access contents,” “Event,” “Applet,” “Parameter object,” or “Shortcut” can be selected.

By setting predetermined items on the above screen, the contents of a page displayed can be edited.

Figure 22:
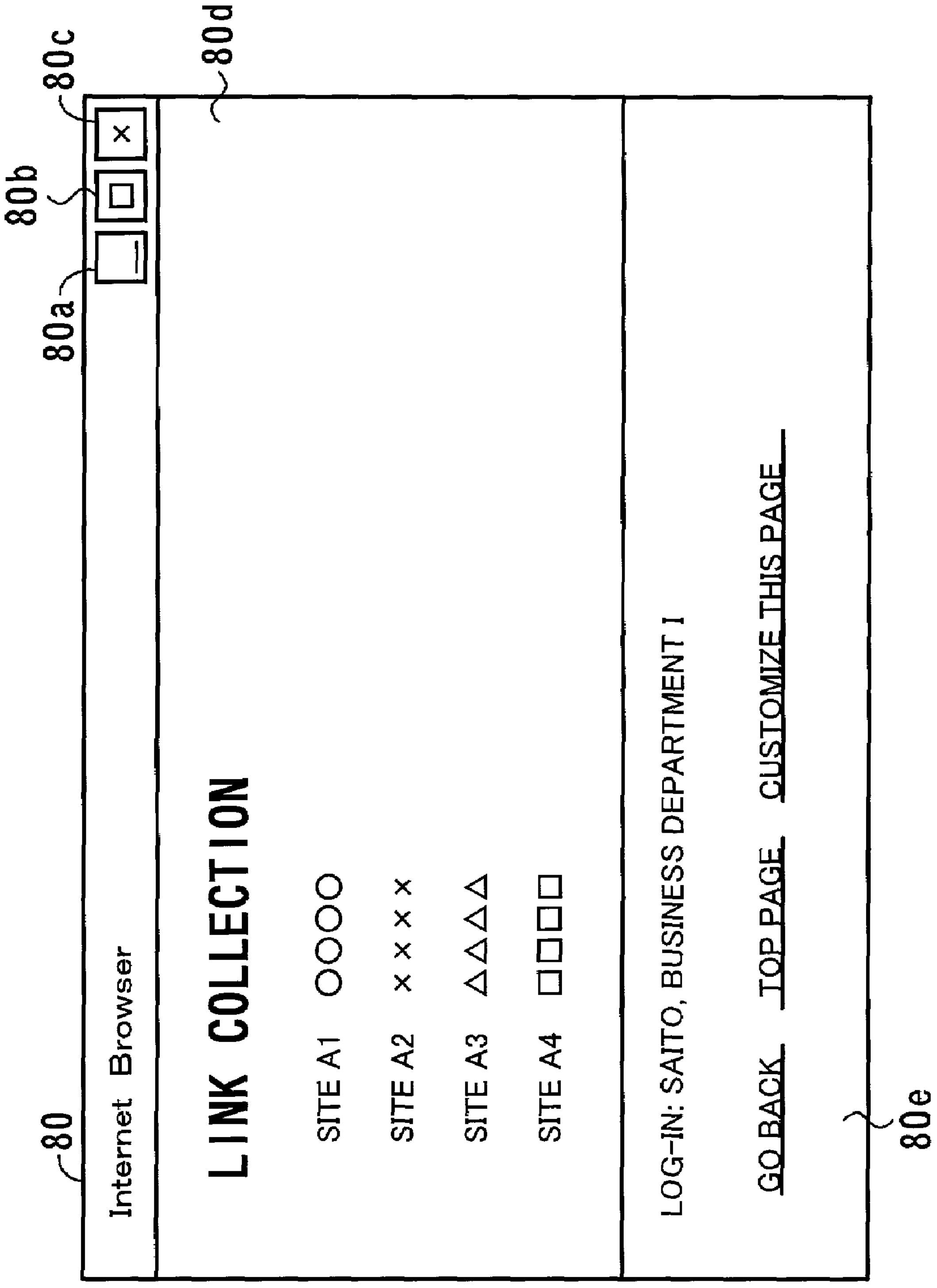
FIG. 22 is a view showing an example of a screen displayed when the Perform button is operated on the screen shown in FIG. 21.

FIG. 22 is a screen displayed when the Display button 70*g* is operated on the screen shown in FIG. 21, and is used to confirm set values.

In this example, a window 80 titled “Internet Browser” is displayed. Its display area is divided into frames 80*d* and 80*e*.

In the frame 80*d*, the title “Link Collection,” hot texts corresponding to the structure of the folders shown in FIG. 20, and descriptions of the hot texts are displayed.

In the frame 80*e*, the name of a user who logged in and hot texts are displayed. The hot text “Go back” is linked to the original page. The hot text “Top page” is linked to the top page. The hot text “Customize this page” is operated when a user customizes a page displayed.

Figure 23:
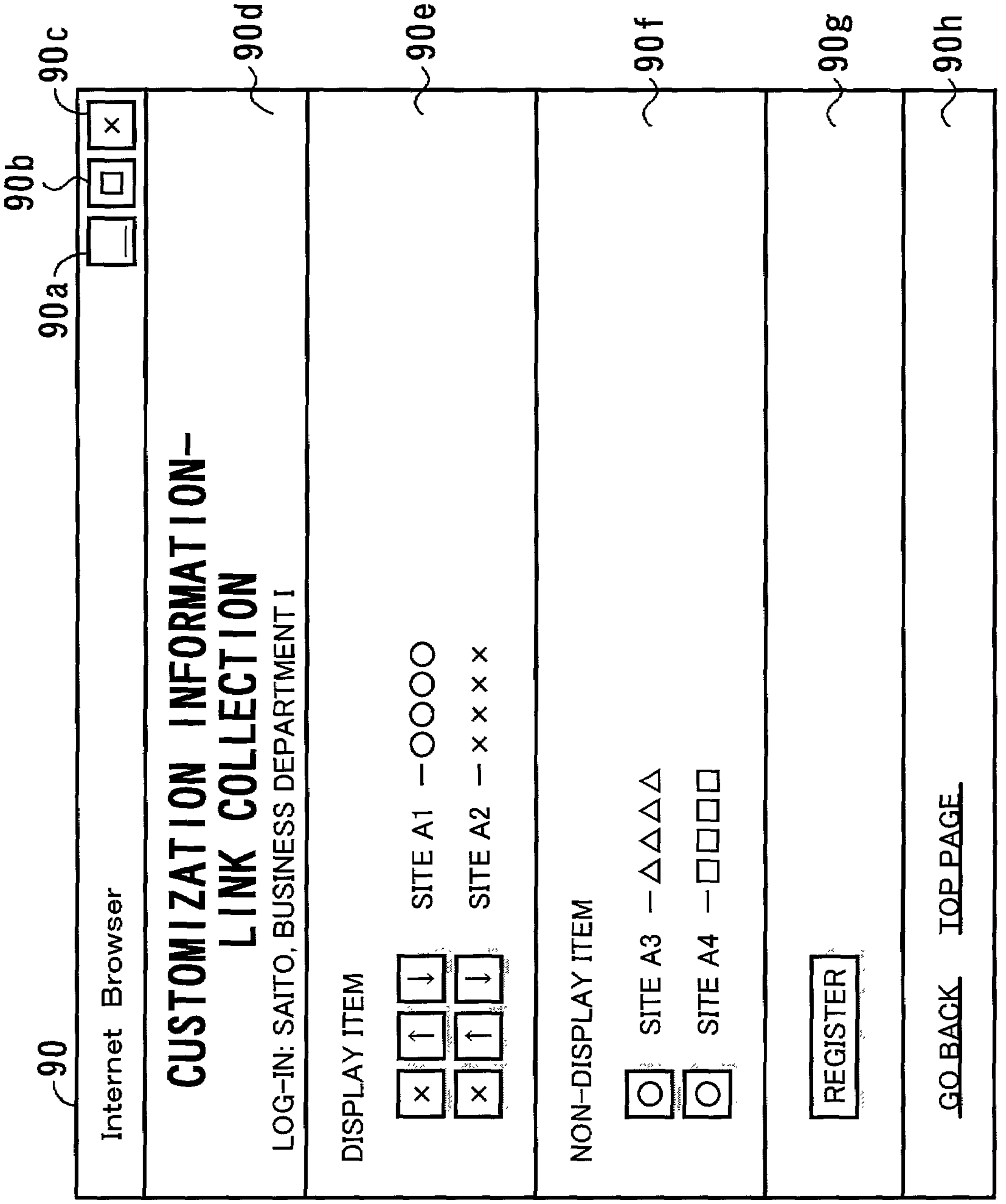
FIG. 23 is a view showing an example of a screen displayed when the Customize Information button is operated on the screen shown in FIG. 20.

When the hot text “Customize this page” on this screen is operated, a screen shown in FIG. 23 will appear.

On the screen shown in FIG. 23, a window 90 titled “Internet Browser” is displayed. Its display area is divided into frames 90*d* through 90*h*.

In the frame 90*d*, the label name “Link Collection” to be customized and the name of a log-in user are displayed.

In the frame 90*e*, items displayed on a page are listed. In this example, Site A1 and Site A2 are selected as display items. A button with a mark of “X” of the three displayed to the left of each item is operated to change a display item to a non-display item. A button with a mark of “ ” to the right of the X button is operated to move up the item’s turn to be displayed. A button with a mark of “ ” to the right of the button is operated to move down the item’s turn to be displayed.

In the frame 90*f*, non-display items are listed. A button with a mark of “○” displayed to the left of each item is operated to change a non-display item to a display item.

In the frame 90*g*, the Register button operated to register set contents is displayed.

Customization by the use of the above screen can be performed only when the item “Customizable” shown in FIG. 21 is checked.

By changing or setting each set item from the above screens, the administrator or a user of the portal server 13 can edit folders, contents, templates, or the like or select or customize information.

(5) Procedure for Accessing the Portal Server from a Client

Figure 24:
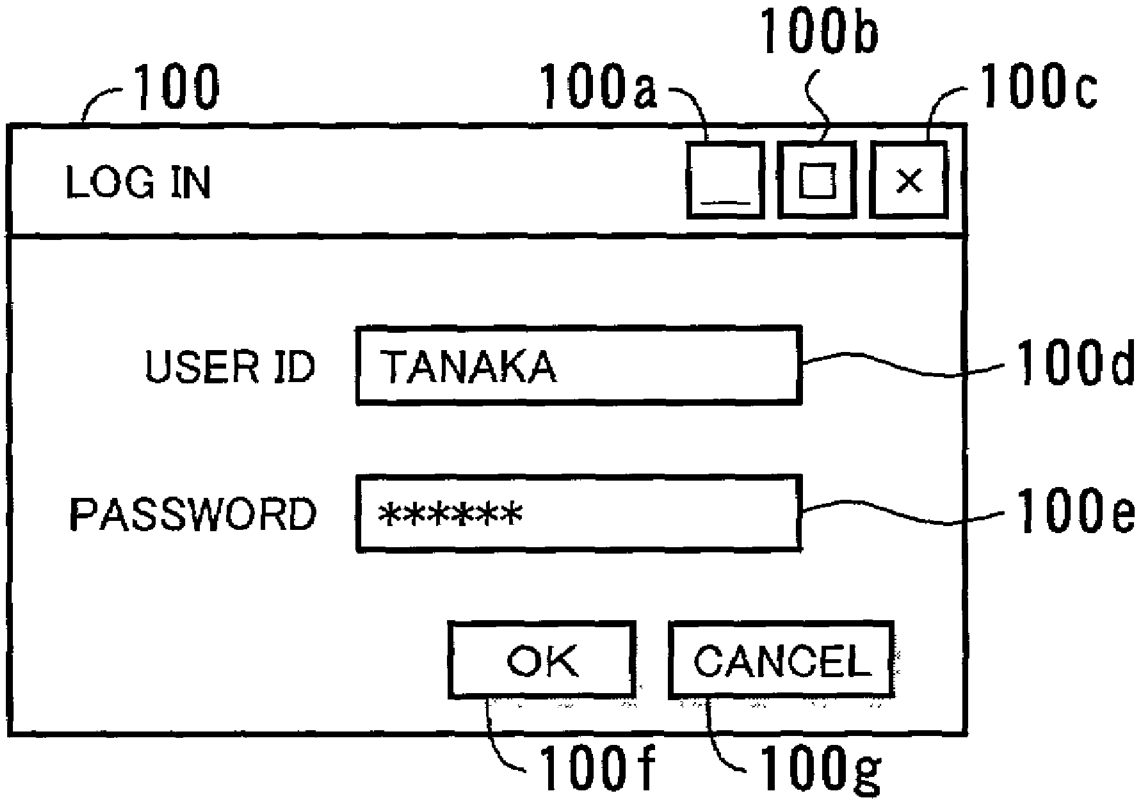
FIG. 24 is a view showing an example of a screen displayed when a user logs in a portal server from a client.

For example, it is assumed that a user logged in the portal server 13 from the client 10. On a display device of the client 10, a screen like the one shown in FIG. 24 will be displayed. On this screen, a window 100 titled “Log-in” is displayed. In its display area, a text box 100*d* for entering a user ID and a text box 100*e* for entering a password are displayed. Furthermore, at the lower right corner of the display area, the OK button 100*f* operated to log in with contents entered and the Cancel button 100*g* operated to cancel contents entered are displayed.

On this screen, a user ID and password are entered and the OK button 100*f* is operated. Then these pieces of information are sent to the portal server 13.

The portal server 13 performs an authentication process on the basis of the user ID and password in order to judge whether or not the user who is logging in is a regular one. If he/she is a regular user, then the portal server 13 obtains his/her log-in name.

Figure 19:
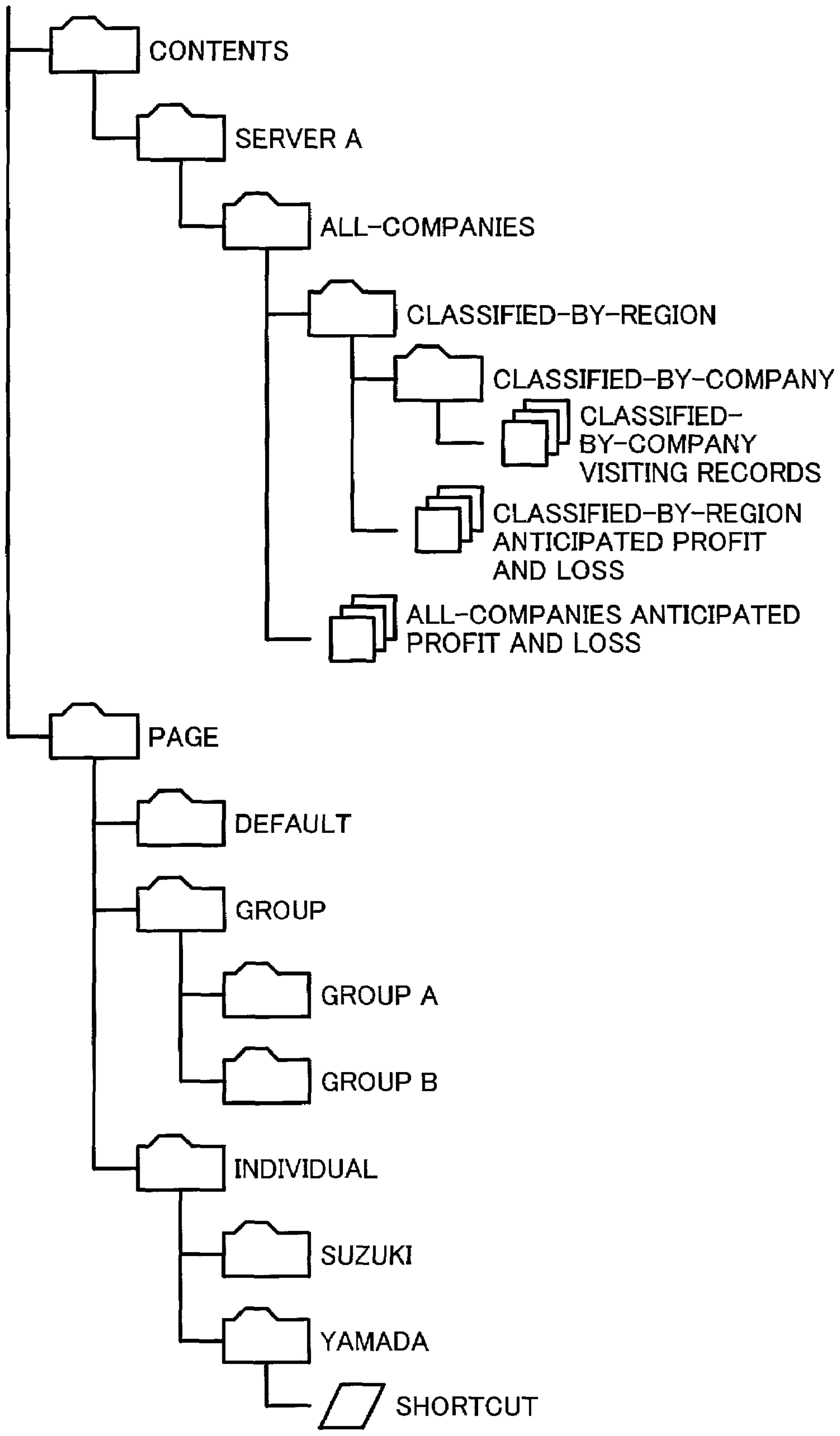
FIG. 19 is a view for describing an example of a folder created by a portal server which received additional information.

If there is an individual folder corresponding to that log-in name, then the portal server 13 obtains a template stored in the folder and executes it. For example, if user “Yamada” logs in, there is an individual folder corresponding to this user, as shown in FIG. 19. Then a template associated with the folder “Yamada” is obtained and executed. As a result, a unique top page created or edited by user “Yamada” will be displayed. The process for executing a template will be described in detail later.

If an individual folder does not exist, the portal server 13 judges whether or not a folder corresponding to a group to which the user who logged in belongs exists. If that folder exists, then a template associated with it is obtained and executed. As a result, a unique top page edited or created by the group will appear on a display device before the user who logged in.

If neither an individual folder nor a group folder exists, a template associated with the default folder (see FIG. 19) is obtained and the default top page will appear.

Figure 25:
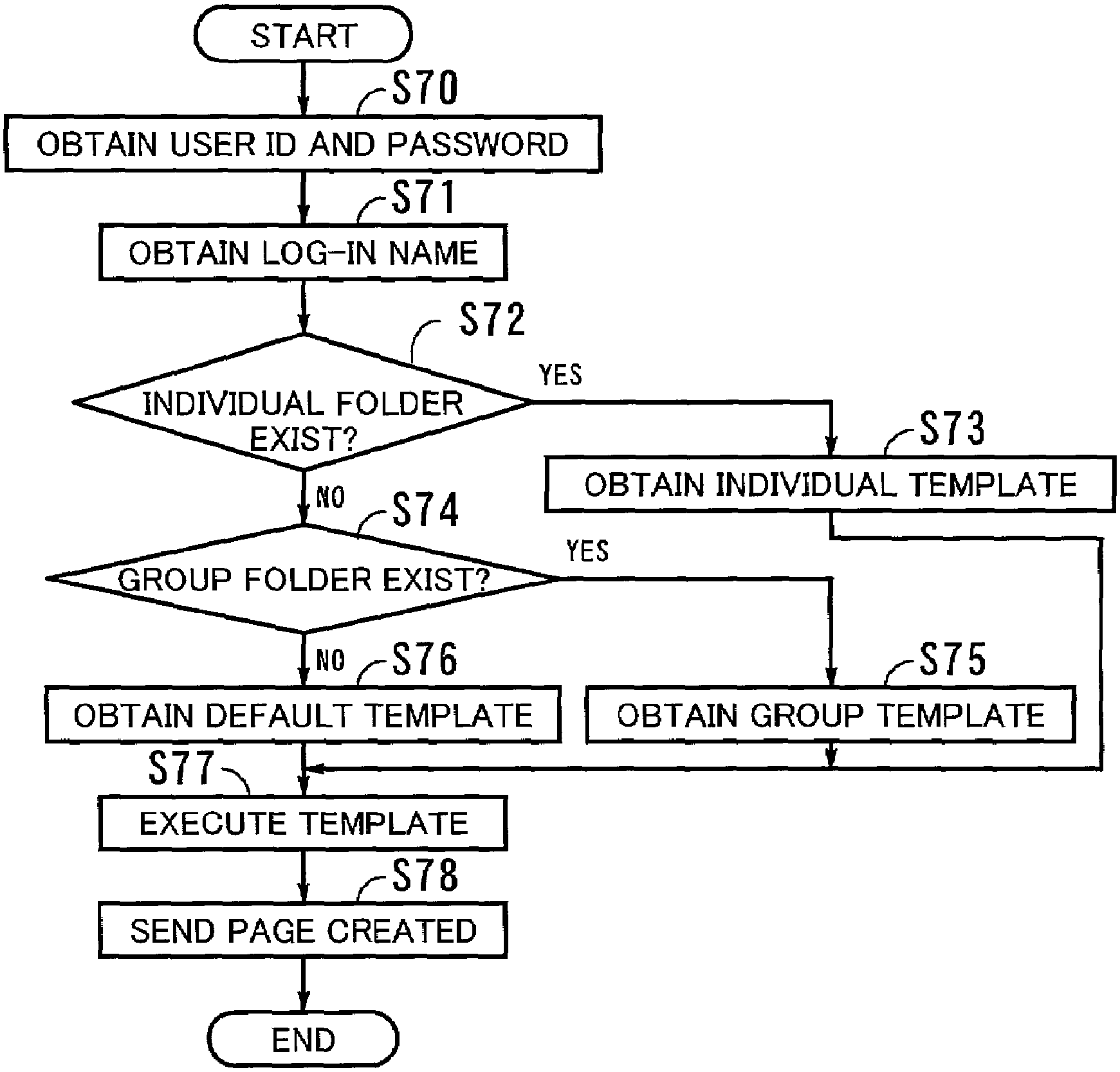
FIG. 25 is a flow chart for describing an example of a procedure performed until a top page is displayed.

FIG. 25 is a flow chart for achieving the above processes. The following procedure will be performed in compliance with this flow chart.

[S70] The portal server 13 obtains a user ID and password from a client which logged in.

[S71] The portal server 13 obtains the user’s log-in name on the basis of the user ID and password it obtained.

[S72] The portal server 13 judges whether or not an individual folder corresponding to the log-in name it obtained exists. If it exists, the portal server 13 proceeds to step S73. If it does not exist, the portal server 13 proceeds to step S74.

[S73] The portal server 13 obtains an individual template associated with the appropriate folder.

[S74] The portal server 13 judges whether or not a group folder corresponding to the log-in name it obtained exists. If it exists, the portal server 13 proceeds to step S75. If it does not exist, the portal server 13 proceeds to step S76.

A group name is obtained from a log-in ID by the use of a table in which log-in IDs and group names are associated.

[S75] The portal server 13 obtains a group template associated with the appropriate folder.

[S76] The portal server 13 obtains the default template stored in the default folder.

[S77] The portal server 13 executes a template it obtained.

[S78] The portal server 13 sends a page created to the client which made a request.

Figure 26:
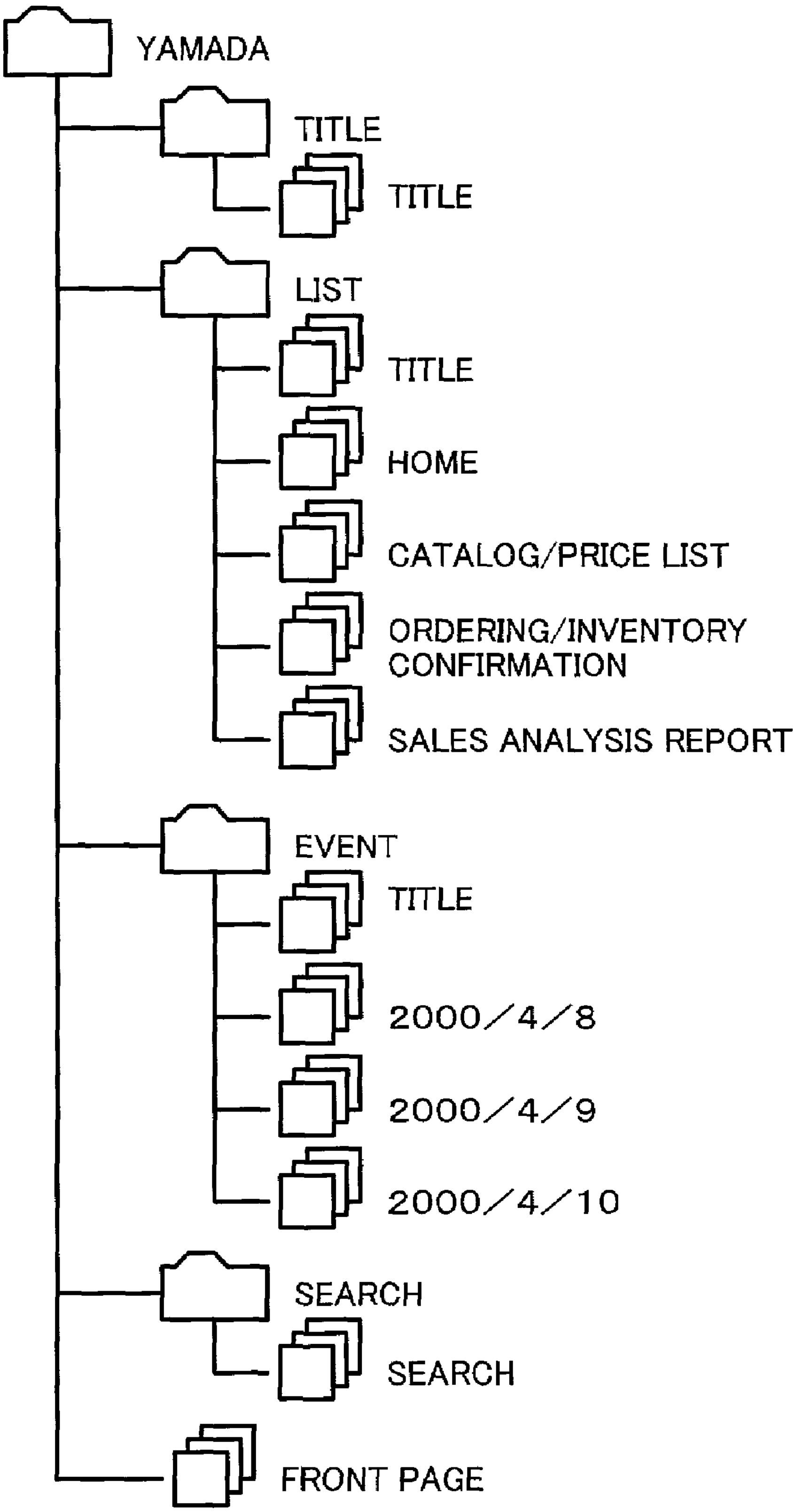
FIG. 26 is a view showing an example of a folder to be displayed.

It is assumed that folders and contents shown in FIG. 26 are stored under the folder “Yamada” shown in FIG. 19 and that user “Yamada” logs in. Then a template stored in the folder “Yamada” is obtained and executed. The template executed at this time is one for assigning contents stored in the subfolders to frames and displaying them. The process for executing a template will be described later with a simple example.

Figure 27:
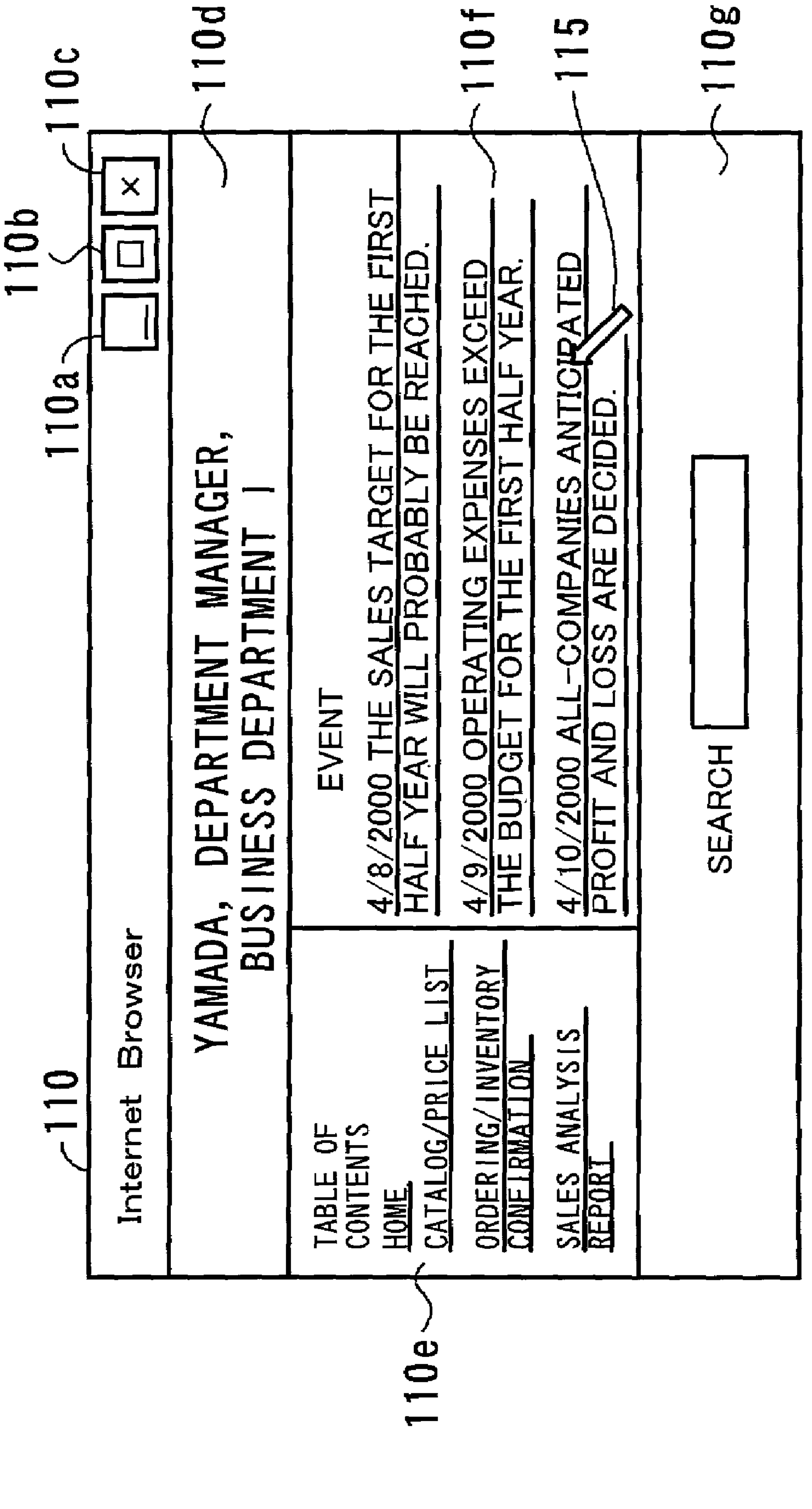

FIG. 27 is an example of a screen displayed on a display device before user “Yamada” as a result of executing a template. In this example, a window 110 titled “Internet Browser” is displayed. Its display area is divided into four frames 110*d* through 110*g*.

In the frame 110*d*, the name of a user who logged in is displayed.

In the frame 110*e*, a table of contents is displayed and selection items are displayed as hot texts.

In the frame 110*f*, events are displayed and hot texts indicating events, being temporary information created for a specified user, are displayed.

In the frame 110*g*, a text box for entering a search keyword is displayed.

On this display screen, it is assumed that the hot text "4/10/2000 All-companies anticipated profit and loss are decided." is selected with a pointer 115. Then the client 10 sends the portal server 13 a request corresponding to this hot text. In this case, it is assumed that information corresponding to the hot text selected is stored in the folder "All-companies" shown in FIG. 19.

The portal server 13 receives the request and then accesses the URL "http://servername/contents/serverA/all-companies" corresponding to the folder "All-companies." In this case, the template "apl. tmpl" associated with this folder will be obtained and executed.

FIG. 28 shows an example of a template executed at this time. The meanings of this template are as follows:

(A) Insert the representation format of an applet object in this folder.

(B) In that case, pass the following as arguments.

Contents passed by ARG1, and

URL of the requester's own subfolder where ARG1 is an argument passed from the client side. In this case, a null character string is passed by ARG1. The display( ) method returns a representation format designated in contents information. The representation format of an applet object is the tag <APPLET>. In this example, however, the representation format of an applet object is redefined by the object soneki_applet, being its subclass, and it is intended that the URL of a folder given by the argument Child should be used as the value of the parameter of the argument Child. Therefore, executing the template will create a page shown in FIG. 29.

The page created is sent to the client 10. Then it will be executed there and displayed. This applet accesses sales data and displays it. It is intended that a URL passed by the argument Child should be used in the case of displaying a regional name, such as Tokyo or Osaka.

Figure 30:
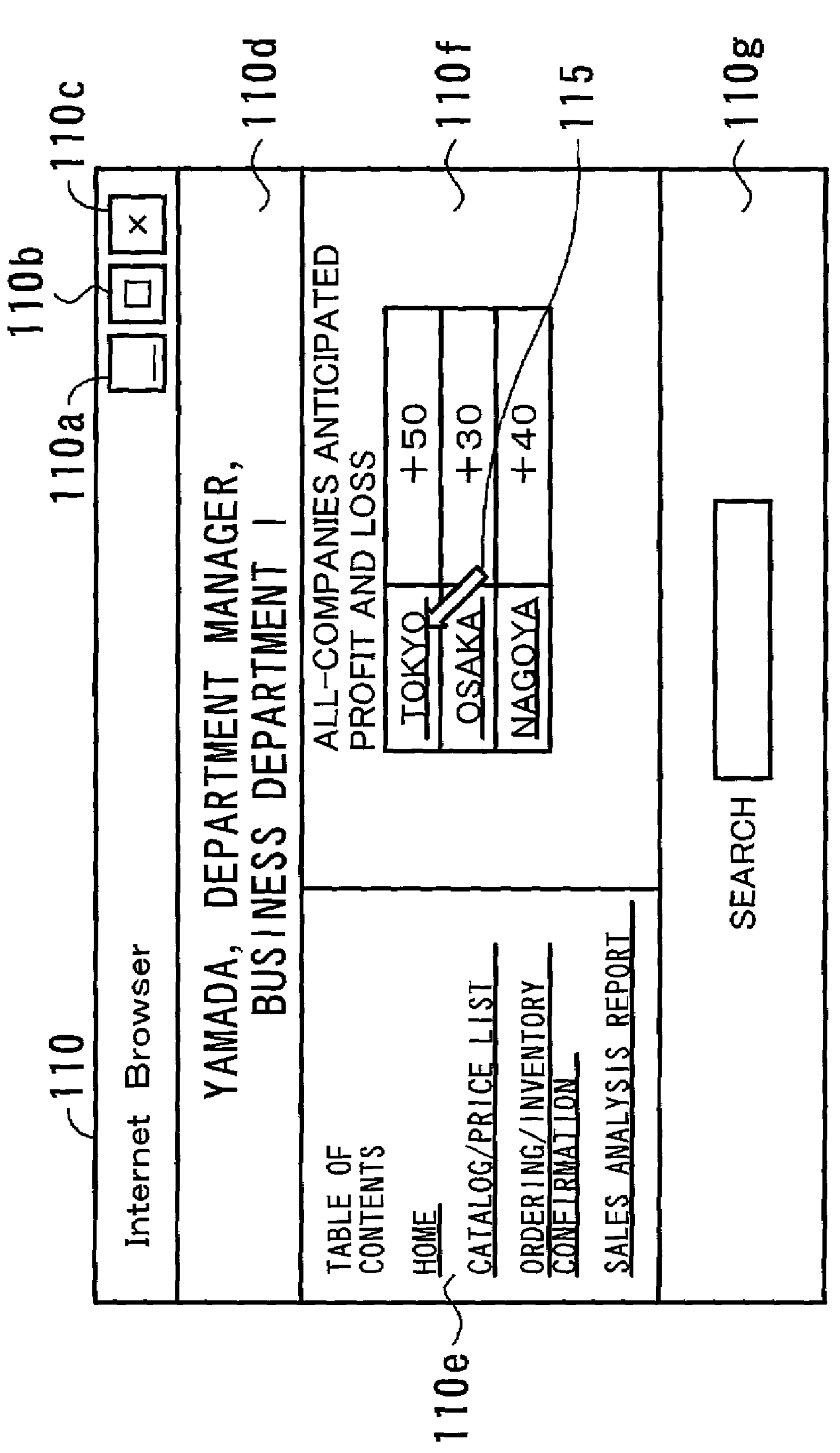
FIG. 30 is a display example of the page shown in FIG. 29.

FIG. 30 is an example of how the page shown in FIG. 29 is displayed on a display device for the client 10. In this example, a table titled "All-companies anticipated profit and loss" is displayed in the frame 110*f*.

On this screen, it is assumed that the hot text "Tokyo" in the table is designated with the pointer 115. Then the client 10 adds the argument "Tokyo" to the URL and accesses the URL "http://servername/contents/serverA/all-companies/classified- by-region?ARG1=Tokyo."

As a result, a template corresponding to the folder "Classified-by-region" will be executed on the portal server 13. A template designated for this folder is "apl. tmpl," which is the same with the folder "All-companies." This template is executed in the same way that was described above. As a result, a page shown in FIG. 31 will be created. On this page,an argument name is "Tokyo" and "classified-by-company" is added to the end of a subfolder name.

Figure 32:
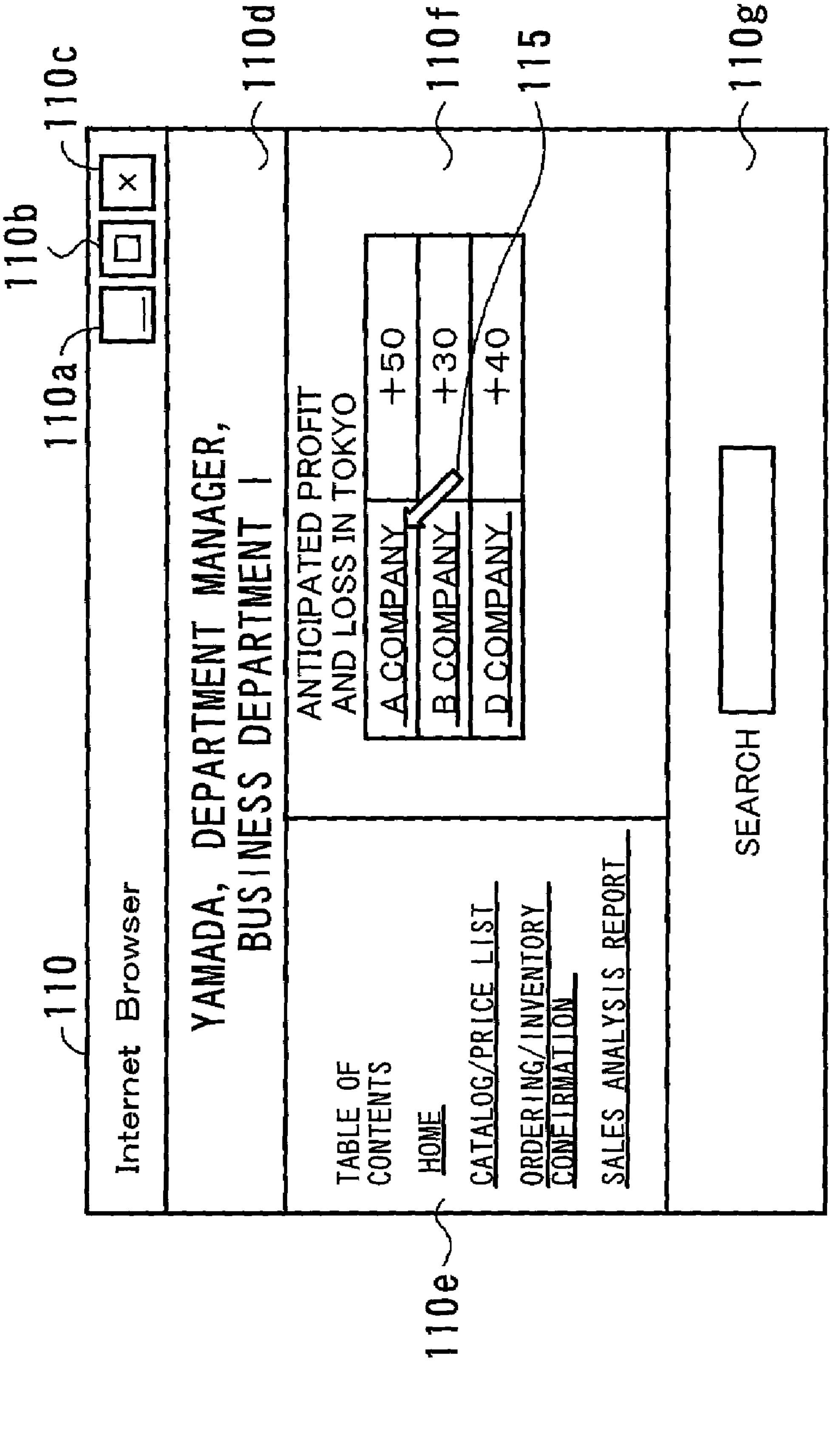
FIG. 32 is a display example of the page shown in FIG. 31.

This page is sent to the client 10. Then it will be executed there and a screen shown in FIG. 32 will be displayed. In this example, a table titled "Anticipated profit and loss in Tokyo" is displayed in the frame 110*f*.

If the hot text "A Company" in the table on this screen is selected with the pointer 115, the client 10 adds the argument "A Company" to the URL of the argument Child and accesses the URL "http://servername/contents/serverA/all-companies/classified- by-region/classified-by-company?ARG1=Acompany."

Then the folder "Classified-by-company" is accessed, the same template that was described above is executed, and a page shown in FIG. 33 is created. On this page, "A Company" and a null character string are designated as the arguments "company value" and "child value" respectively.

Figure 34:
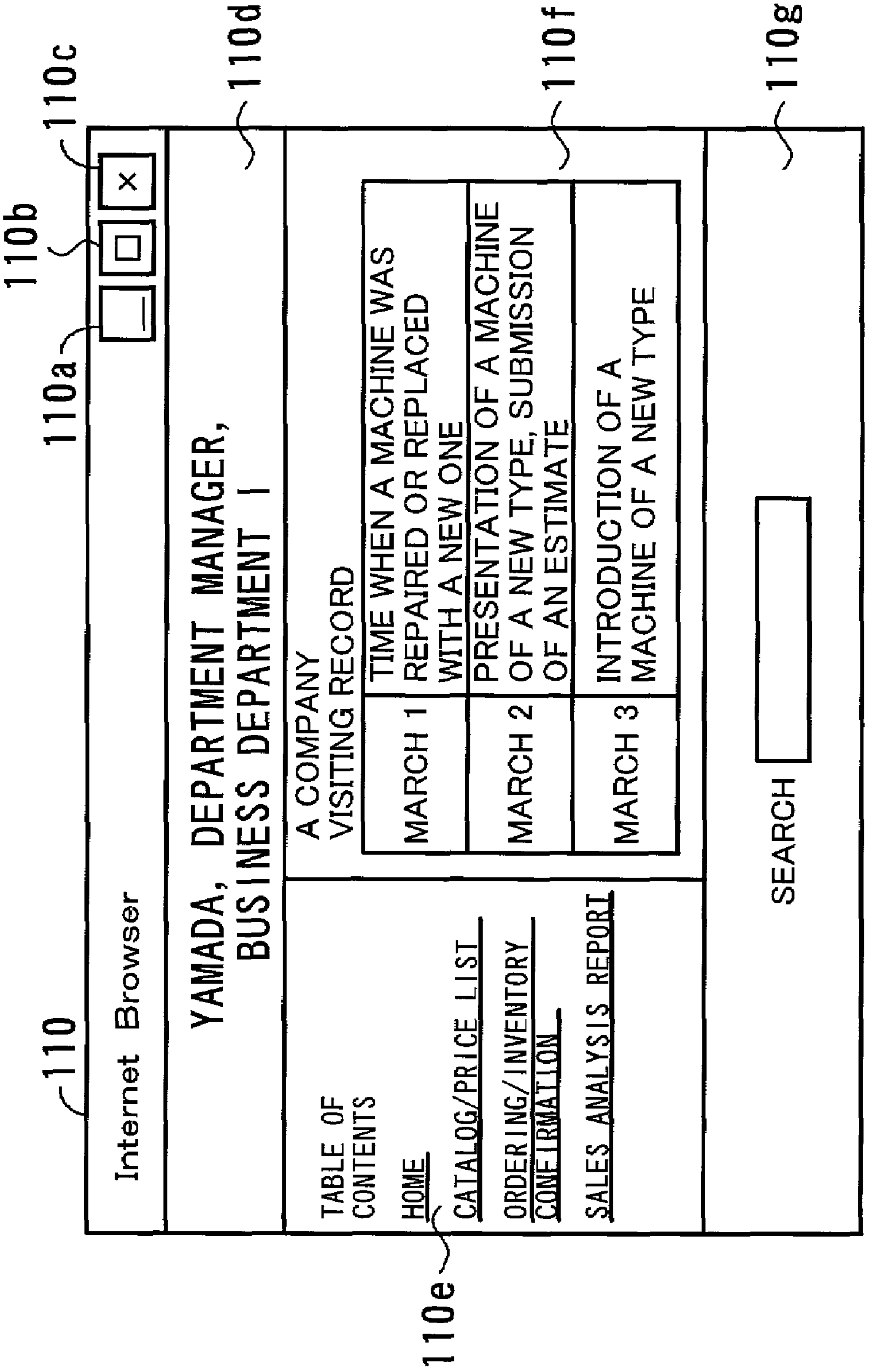
FIG. 34 is a display example of the page shown in FIG. 33.

This page is sent to the client 10. Then a display process is performed on it there and a screen shown in FIG. 34 is displayed.

In this example, a table titled "A Company visiting record" is displayed in the frame 110*f*.

As described above, in an information processing system according to the present invention, additional information indicating the attributes of contents and relations among the contents is obtained from information disclosing servers and is stored in a portal server. This enables to utilize relations among contents in the case of creating a page. Therefore, compared with cases where only the attributes of contents are obtained, a page can be created more quickly.

Furthermore, according to the present invention, the logical structure of contents is mapped to the hierarchical structure of folders. As a result, contents can be edited easily.

In the above embodiment, templates are associated with folders and are stored collectively in a predetermined location. However, they can be stored directly in each of folders.

The above procedures can be achieved with a computer. In that case, the contents of functions which a portal server, client, and information disclosing server must have are described in a program recorded on a record medium which can be read with a computer. The above procedures are achieved with a computer by executing this program on the computer. A record medium which can be read with a computer can be a magnetic recording medium, a semiconductor memory, or the like. In order to place this program on the market, it can be stored on a portable record medium, such as a compact disk read only memory (CD-ROM) or a floppy disk. Alternatively, it can be stored in a memory of a computer connected via a network and be transferred to another computer via a network. When this program is executed on a computer, it is stored on a hard disk etc. in the computer and is loaded into a main memory.

As described above, in an information processing system comprising an information disclosing server for disclosing contents to a client, a portal server for obtaining information regarding contents from the information disclosing server and for creating display data provided to each client, and a client for obtaining and displaying display data created by the portal server, according to the present invention, the information disclosing server comprises contents storing means for storing contents to be disclosed and additional information storing means for storing additional information indicating the respective attributes of contents to be provided of contents stored in the contents storing means and relations among the contents to be provided, the portal server comprises additional information obtaining means for obtaining additional information stored in the additional information storing means in the information disclosing server, additional information storage means for storing additional information obtained by the additional information obtaining means, display data creating means for obtaining, in the case of a request having been made from the client, the appropriate additional information from the additional information storage means and for creating display data, and sending means for sending display data created by the display data creating means to the client which made a request, and the client comprises send requesting means for requesting the portal server to send predetermined display data, receiving means for receiving display data sent from the portal server as a result of a request from the send requesting means, and display outputting means for outputting display data received by the receiving means. Therefore, a desired page can be created easily by utilizing contents disclosed by an information disclosing server.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing system, comprising:

an information disclosing server for disclosing contents;

a portal server for obtaining information regarding contents from the information disclosing server and creating display data;

wherein the information disclosing server includes:

contents storing means for storing the contents; and additional information storing means for storing additional information indicating attributes of the contents stored in the contents storing means and relations among the stored contents;

and further wherein the portal server includes:

additional information obtaining means for obtaining the additional information stored in the additional information storing means in the information disclosing server;

a portal server additional information storage means for storing the obtained additional information on each contents object by creating folders having a hierarchical structure corresponding to logical structure of the contents objects, storing the respective attributes of the contents in the folders corresponding thereto, and associating each folder with a template specifying an applet and arguments therefore;

display data creating means for creating display data for a specified contents object in response to a request from a user of a client connected with the information disclosing server via the portal server, by executing the applet specified in the template that is associated with the folder corresponding to the specified contents object; and sending means for sending the created display data to the requesting client.

2. The information processing system according to claim 1 wherein the additional information storage means contains a shortcut by which other folders or contents can be referred to from a predetermined folder.

3. The information processing system according to claim 2, further comprising editing means for editing additional information stored in the additional information storage means.

4. The information processing system according to claim 3, further comprising user additional information storage means for storing additional information according to users, wherein the editing means also edits additional information stored in the user additional information storage means, further wherein the display data creating means also creates display data from additional information stored in the user additional information storage means.

5. The information processing system according to claim 1, wherein the additional information obtaining means obtains additional information from the information disclosing server by a method designated in advance.

6. The information processing system according to claim 1, further comprising additional information creating means for creating additional information from contents stored in the contents storing means.

7. A portal server disposed between an information disclosing server and a client, the portal server comprising:

additional information obtaining means for obtaining additional information about contents stored in the information disclosing server;

the additional information indicating attributes of, and relations among, the stored contents;

additional information storage means for storing the obtained additional information on each contents object by creating folders having a hierarchical structure corresponding to logical structure of the contents objects, storing the respective attributes of the contents in the folders corresponding thereto, and associating each folder with a template specifying an applet and arguments therefor;

display data creating means for creating display data for a specified contents object in response to a request from the client, by executing the applet specified in the template that is associated with the folder corresponding to the specified contents object; and sending means for sending the created display data to the requesting client .

8. A computer-readable medium recording a computer program executed on a portal server disposed between an information disclosing server and a clients, the program executing functions comprising:

obtaining additional information about contents stored in the information disclosing server, the additional information indicating attributes of, and relations among, the stored contents;

storing the obtained additional information on each contents object by creating folders having a hierarchical structure corresponding to logical structure of the contents objects, storing the respective attributes of the contents in the folders corresponding thereto, and associating each folder with a template specifying an applet and arguments therefor;

creating display data for a specified contents object in response to a request from the client, by executing the applet specified in the template that is associated with the folder corresponding to the specified contents object; and sending the display data created to the requesting client.

9. The information processing system according to claim 1, wherein the applet consults the hierarchical structure of folders to select and process each child contents object that belongs to the contents object corresponding to a template that is currently used.

* * * * *

UNITED STATES PATENT AND TRADEMARK OFFICE

CERTIFICATE OF CORRECTION

PATENT NO. : 7,194,524 B2
APPLICATION NO. : 09/812550
DATED : March 20, 2007
INVENTOR(S) : Hiroyuki Suzuki et al.

It is certified that error appears in the above-identified patent and that said Letters Patent is hereby corrected as shown below:

Column 19, line 51, change “1 wherein” to --1, wherein--.

Column 20, line 16, change “server;” to --server,--;
line 33, change “client .” to --client.--; and
line 36, change “clients,” to --client,--.

Signed and Sealed this

Twenty-sixth Day of June, 2007

JON W. DUDAS
*Director of the United States Patent and Trademark Office*